(12) United States Patent
de Haas et al.

(10) Patent No.: US 10,615,996 B2
(45) Date of Patent: Apr. 7, 2020

(54) APPARATUSES AND METHODS FOR SWITCHING COMMUNICATION MODES OF A TRANSCEIVER CIRCUIT

(71) Applicant: NXP B.V., Eindhoven (NL)

(72) Inventors: Clemens Gerhardus Johannes de Haas, Ewijk (NL); Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/920,606

(22) Filed: Mar. 14, 2018

(65) Prior Publication Data

US 2019/0288870 A1   Sep. 19, 2019

(51) Int. Cl.
| | |
|---|---|
| *H04L 25/06* | (2006.01) |
| *H04L 12/40* | (2006.01) |
| *H04B 3/46* | (2015.01) |
| *H04L 25/02* | (2006.01) |
| *H04B 1/401* | (2015.01) |

(52) U.S. Cl.
CPC ......... *H04L 12/40032* (2013.01); *H04B 3/46* (2013.01); *H04L 25/0272* (2013.01); *H04L 25/0278* (2013.01); *H04L 25/06* (2013.01); *H04B 1/401* (2013.01); *H04L 2012/40215* (2013.01)

(58) Field of Classification Search
CPC ........... H04L 12/40032; H04L 25/0272; H04L 25/0278; H04L 25/06; H04B 3/46
See application file for complete search history.

(56) References Cited

U.S. PATENT DOCUMENTS

| | | | |
|---|---|---|---|
| 8,593,202 B2 | 11/2013 | Mori et al. | |
| 9,178,764 B2 | 11/2015 | Hartwich et al. | |
| 2012/0233341 A1* | 9/2012 | Mach | H04L 29/06 709/228 |

(Continued)

FOREIGN PATENT DOCUMENTS

| | | |
|---|---|---|
| DE | 102010043484 A1 | 5/2012 |
| EP | 3217602 A1 | 9/2017 |

(Continued)

OTHER PUBLICATIONS

U.S. Appl. No. 15/412,556, filed Jan. 23, 2017.

(Continued)

*Primary Examiner* — Syed Haider
(74) *Attorney, Agent, or Firm* — Rajeev Madnawat

(57) ABSTRACT

Embodiments in accordance with present disclosure are directed to methods, devices, and apparatuses. An example embodiments include an apparatus comprising a differential data bus and a transceiver circuit. The transceiver circuit includes a differential driver and differential receiver that operate and communicate in the first communication mode and the second communication mode. The transceiver circuit is configured to switch to the second communication mode in response detecting a signal edge of a signal input received at the differential driver by at least one of: the differential driver being configured and arranged to drive a differential driver voltage on the differential data bus to a voltage that overrides a predefined voltage; and pre-conditioning the differential receiver for the transition to the second communication mode.

17 Claims, 9 Drawing Sheets

(56) References Cited

U.S. PATENT DOCUMENTS

| | | | |
|---|---|---|---|
| 2013/0294540 A1* | 11/2013 | Hell | H04L 25/0272 |
| | | | 375/295 |
| 2014/0156893 A1* | 6/2014 | Monroe | G06F 13/372 |
| | | | 710/117 |
| 2015/0095711 A1* | 4/2015 | Elend | G06F 11/221 |
| | | | 714/39 |
| 2016/0365881 A1* | 12/2016 | Kishigami | H03H 11/245 |
| 2017/0257208 A1* | 9/2017 | Robertson | H04L 5/16 |
| 2019/0058614 A1 | 2/2019 | de Haas et al. | |

FOREIGN PATENT DOCUMENTS

| | | |
|---|---|---|
| JP | 5498527 B2 | 5/2014 |
| JP | 5543402 B2 | 7/2014 |
| WO | WO-2004/023423 A2 | 3/2004 |
| WO | WO-2004/023423 A3 | 3/2004 |
| WO | 2015011515 A1 | 1/2015 |

OTHER PUBLICATIONS

U.S. Appl. No. 15/412,659, filed Jan. 23, 2017.
International Application No. EP 17159590.3, filed Mar. 7, 2017.
Lin, Bin—Philips Semiconductors; "Application Note AN2005—AU 5790 Single Wire CAN Transceiver"; 25 pages (Apr. 16, 2001).
NVE Corporation: IL41050TA—High-Speed, Low-Power Isolated CAN Transceiver; Datasheet; Retreived from the Internet: URL:http://pdf.datasheetarchive.com/indexerfiles/Datasheets-D6/DSAH1000109075.pdf; 16 pages; retreived on Aug. 7, 2014.

\* cited by examiner

APPARATUSES AND METHODS FOR SWITCHING COMMUNICATION MODES OF A TRANSCEIVER CIRCUIT

OVERVIEW

Aspects of various embodiments are directed to apparatuses including at least one transceiver circuit that has different modes for transmitting data. More specific embodiments are directed to a bus network in which logic/CPU circuits, or circuit nodes, communicate over an interconnecting a network bus.

Network busses can have protocols used to enable communications between various node circuits. As an example, a controller area network bus (CAN bus) is a message-based communications bus protocol that is often used with automobiles. The CAN bus protocol are often used to enable communications between various vehicle-specific circuit nodes or as sometimes referred to as electronic control units (ECUs), exemplified by: engine control module (ECM), power train control module (PCM), and various other logic nodes such as those for controlling airbags, mirror adjustment, battery and recharging systems for hybrid/electric cars, among others.

In such bus applications, several implementation limitations for bus signals exist. In many bus applications, such as in high speed CAN, two bus lines are used for data transmission in ISO/OSI layer. In CAN applications, these two bus lines are CANH (high voltage line) and CANL (low voltage line). Data signals are transmitted by using two different levels, a dominant level and a recessive level. For realizing these two levels, the two bus lines are driven symmetrically with respect to an intermediate voltage.

In some instances, a bus network can include multiple nodes located at varying distances to terminating impedances at end nodes. Nodes that are furthest from the terminating impedances can cause noise, such as reflection and ringing, and the bus which can reduce the maximum data rate at which the bus may operate correctly. Traditionally, other factors such as the length of the bus cable, limit the data rate to a speed below at which reflection would become an issue. However, advance on bus protocols, such as CAN FD, have increased the possible data rate to a point at which reflection may negatively impact performance of the bus network.

These and other matters have presented challenges to efficiencies of transceiver circuit implementations, for a variety of applications.

SUMMARY

Various example embodiments are directed to issues such as those addressed above and/or others which may become apparent from the following disclosure concerning an apparatus including a transceiver circuit for use in a bus network. The transceiver circuit can expedite switching from a first communication mode to a second communication mode, such as a recessive bit transition, by detecting or otherwise responsive to a signal edge of an input signal received at the differential driver of the transceiver circuit.

In certain example embodiments, aspects of the present disclosure involve an apparatus including a differential data bus and a transceiver circuit. The transceiver circuit can include circuitry for switching from a first communication mode to a second communication mode, such as logical signal states defined by a bus protocol (e.g., a recessive state and dominant state). The transceiver circuit can expediting switching from the first communication mode to the second communication mode in response to detecting a signal edge of a signal input received at a differential driver of the transceiver circuit, which indicates a transition of the transceiver circuit from the first communication mode to the second communication mode.

In a more specific example embodiment, an apparatus includes a differential data bus and a transceiver circuit configured to send and receive data on the differential data bus. The transceiver circuit includes a differential driver and a differential receiver. Both the differential driver and the differential receiver can operate and communicate in the first communication mode and the second communication mode. For example, the differential driver, which can also be referred to as a bus transmit driver, can convert digital bit streams to differential signals on bus lines connected to the transceiver circuit that are indicative of the data in the digital bit stream. The differential receiver, which can be referred to as a receiver driver or comparator, can convert the differential signals on the connected bus lines to digital bit streams. The transceiver circuit can operate in different communication modes, such as signal states. In order to achieve particular bus speeds in a cable topology, the communication protocols of the bus network may indicate that the physical bits on the bus line, as driven by the differential driver, be symmetrical with the input digital bit stream by the differential receiver. The transceiver circuit can be configured to prevent unwanted delay of the differential receiver in switching to the second communication mode.

In more specific and related embodiments, the transceiver circuit can expedite switching from the first communication mode to the second communication mode by the differential driver driving a differential driver voltage on the differential data bus to a voltage that overrides a predefined voltage. The predefined voltage can include a value that is less than or equal to a switching threshold of the differential receiver. In some specific embodiments, the predefined voltage can include zero V, 0.5 V, 0.25V or other values for a switching threshold of 0.5V. The switching threshold can include a value between the bus levels for the first and second communication modes, e.g., a value between 0 and 1. The override voltage can be less than the predefined voltage, such as 0.25V, 0V, and a negative voltage. Accordingly, the transceiver circuit can override a driver signal of the differential driver with a different amplitude than a predefined voltage for switching the differential receiver from the first communication mode to the second communication mode. As previously described, the differential receiver monitors the bus lines as output by the differential driver. The differential receiver responds to the differential driver voltage on the differential data bus by transitioning to the second communication mode, such as outputting a digital bit stream (e.g., receive data) that is indicative of the physical bits on the bus line (e.g., a recessive state).

In other more specific and related embodiments, the transceiver circuit can prepare the differential receiver by pre-conditioning the differential receiver for transitioning to the second communication mode responsive to detecting the signal edge of the signal input received at the differential driver. The transceiver circuit can further include sense (e.g., impedance control) circuitry. The sense circuitry can monitor the signal input to the differential driver and provide a signal to the differential receiver responsive to detecting the signal edge of the signal input. More specifically, the signal input to the differential driver can include a transmit data (TXD) signal as received at the transceiver circuit. The signal provided to the differential receiver can include an offset to a receiver switching threshold. For example, the signal can include an increase in the receiver switching threshold, thereby preparing the differential receiver to transition to the second communication mode. The differential receiver outputs a signal representative of the differential driver voltage, which is on the differential data bus, responsive to the differential driver voltage exceeding the offset receiver threshold. In other embodiments, the signal is indicative of an output signal that the differential receiver is to provide and that is associated with the second communication mode. The differential receiver outputs the signal in response, which represents a switch to the second communication mode.

Further, in accordance with each of the above-described embodiments, the transceiver circuit and/or sense circuitry can prepare the differential receiver for expediting switching to the second communication mode while controlling an output impedance of the transceiver circuit to be within a predefined range of an impedance value at the first communication mode. For example, the sense circuitry (e.g., impedance control circuitry) can control an output impedance of the transceiver circuit to be within a predefined range of an impedance value at the first communication mode while preparing the differential receiver for expediting switching to the second communication mode and while the differential driver voltage on the differential data bus decreases to a predefined voltage, and, in some aspects, to a value below the predefined voltage.

In some specific examples, the differential driver drives the differential driver voltage to a first voltage in response to detecting the signal edge and for a first period of time, and drives the differential driver voltage to a second voltage that is greater than the first voltage for a second period of time. The second voltage can be predefined for switching the differential receiver from the first communication mode to the second communication mode. The differential driver voltage can be driven to the first voltage for the first period of time and responsive to detecting the signal edge that is sufficient to prevent or mitigate system Electro Magnetic Emission (EME) performance and bus network protocols, such as a first period of time of between 30-150 nanoseconds, although embodiments are not so limited.

In other embodiments, the differential driver drives the differential driver voltage to the second voltage, and does not first drive the differential driver voltage to the first voltage. In such embodiments, the sense circuitry can provide an input signal to the differential receiver to prepare the differential receiver for the transition to the second communication mode, as described above.

In some specific and related embodiments, the transceiver circuit is part of a node in a bus network. The bus network can include a plurality of nodes, each having a transceiver circuit and microcontroller that communicate over a differential data bus, as further described herein.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
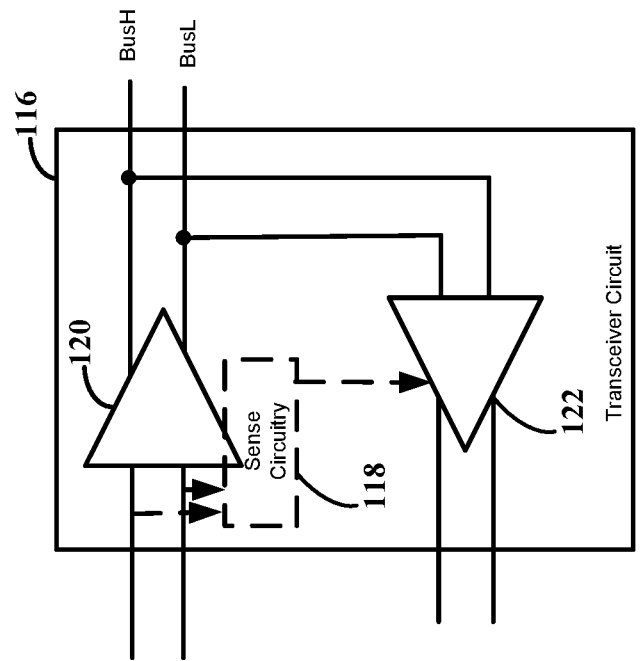
FIGS. 1A-1B illustrate example apparatuses including transceiver circuits, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving switching a transceiver circuit from a first communication mode to a second communication mode. In certain implementations, aspects of the present disclosure have been shown to be beneficial when used in the context of an apparatus including a differential data bus and a transceiver circuit, where the transceiver circuit can symmetrically switch a differential driver and differential receiver to a second communication mode. In some embodiments, the switching of the differential receiver from the first communication mode to the second communication mode is expedited, such as a recessive bit transition, by detecting or otherwise responsive to a signal edge of an input signal received at the differential driver of the transceiver circuit. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed to an apparatus that forms part of a bus network. The apparatus can include a differential data bus and a transceiver circuit configured to send and receive data on the differential data bus. The bus network can include a plurality of nodes that are connected to a differential bus line. The bus lines can form a twisted-pair cable having nominal cable impedance, such as 120 ohms. Each node includes a transceiver circuit and, optionally, a microcontroller that determines messages that are to be transmitted on the differential data bus, as further described herein. The microcontroller further includes or is in communication with a protocol controller and provides these messages to the protocol controller. The microcontroller may receive messages from the transceiver circuit and interpret the received messages. The protocol controller may receive bits from the differential data bus via the transceiver circuit and reconstruct the bits into a message to be interpreted by the microcontroller, which can be referred to as receive data (RXD) that is carried on a RXD path. The protocol controller may receive a message from the microcontroller and provide the message as serial bits to the differential data bus via the transceiver circuit, which can be referred to as transmit data (TXD) that is carried on a TXD path. The transceiver circuit may convert the digital data bits on the TXD path from the protocol controller into analog bus signals. The transceiver circuit may convert analog bus signals into digital bits to be provided via the RXD path to the protocol controller. Bits are sent with positive differential bus voltage (e.g., dominant) and with zero differential bus voltage (e.g., recessive).

In some embodiments, not all of the nodes of the bus network are terminated or may be applied with a high ohmic termination in the kilo-Ohms range. For example, the bus network can include a non-heterogeneous topology, such as a cable harness, where at least some nodes are non-terminated. The terminated nodes can have a termination resistance $R_{Term}$ "T" according to the nominal cable impedance such as 120Ω. When, for instance, one of the non-terminated nodes that is further away from the termination resistors at the terminated nodes starts sending data, reflections in the network may cause signal disturbances. In general, reflections in the bus network may be caused by the open tap lines and the star points in the cable harness regardless of which node is sending data (including terminated nodes). The protocol controller may sample the differential data bus, for instance, at 70% of bit time. If the duration of the signal disturbance is longer than the typical sampling time, erroneous bit information may be captured, which may result in a corrupted data message. By using a longer bit time, the problem of signal disturbance may be mitigated. However, the maximum data transmission rate of the network may be reduced. Reflections due to tap lines that are too long are a limiting factor for transmission rate when using network topologies developed for the protocol at a transmission rate of, e.g., 500 kb/s, also for the more recent CAN FD protocol, which specifies transmission data rates from 1 MBit/s to 5 MBit/s or even higher. Further, it should be considered that even with a well-terminated network, high capacitance bus loading may also negatively impact the transmission rate. In the case of a high number of CAN nodes connected to the CAN network, the dominant to recessive transitions becomes very slow. Besides the capacitive impact, the cable impedance may vary with temperature resulting in a non-matched bus termination which again causes reflections even at the terminated ends of a bus network.

Various specific embodiments are directed to a bus network that operates in first communication mode (e.g., dominant state) and second communication modes (e.g., recessive state). In the second communication mode, the transmitter circuit is high ohmic (e.g., >12 kohms, in other instances, more than 10 kohms or more than 15 kohms). When each connected node adds a capacitance of, for instance, a maximum of 100 pF to the bus and the bus impedance is fixed at 60Ω, the first communication mode to second communication mode transition will not be faster than approximately 100 ns in the case of a network to which ten nodes are connected. The more nodes are connected to the bus lines, the higher the overall capacitance will be and the longer the second communication mode (e.g., recessive bit transition will take). For complex topologies, the successful second communication mode bit transition reaching a reliable recessive bit level at all nodes may take several 100 ns up to e.g., 1 μs including all ringing effects. If it is desirable to have a transmission rate of 5 MBit/s or higher, the bit time is 200 ns, which may be shorter than the bit transition time and may cause communication failures.

Under typical signal reflection/ringing conditions, the implementation of the bus network may be limited by certain parameters in order to reduce signal reflection/ringing and to protect the integrity of the signaled data at higher data rates. For example, the differential data bus may have a maximum length at which maximum data rates may be achieved. In another example, the tap lines connecting the nodes to the differential data bus may be kept as short as possible to reduce reflections. However, the length of the bus and the tap lines may be subject to other factors and it may not always be possible to have tap lines that are as short as desired. For example, in an automotive application, the implementation of the CAN network may be governed by the shape and size of a vehicle and the position of the CAN nodes. Furthermore, even in the case where the tap lines are as short as is practical, ringing may still occur at higher data rates. The signal reflection/ringing in the un-terminated tap lines may corrupt the communication on the differential data bus, which can become more of a problem with particular protocols, such as CAN FD protocols, where the data rate is higher. One way to address ringing is to redesign the network topology to improve termination, which can be time consuming and costly. Typically, the maximum bus length is determined by, or rather is a trade-off with the selected signaling rate and the signaling rate decreases as the transmission distance increases. While steady-state losses may become a factor at the longest transmission distances, the main factors limiting signaling rate as distance is increased are time varying. Cable bandwidth limitations, which degrade the signal transition time and introduce inter-symbol interference (ISI), are primary factors reducing the achievable signaling rate when transmission distance is increased. For a differential data bus, the signaling rate is also determined from the total system delay—down and back between the two most distant nodes of a system and the sum of the delays into and out of the nodes on a differential data bus with the typical, e.g., 5.5 ns/m, propagation delay of a twisted-pair cable. Also, consideration should be given the signal amplitude loss due to impedance of the cable and the input transceiver impedance. Since tap lines are un-terminated, signal reflections can develop in a tap line that drive signal levels back and forth across a receiver's input thresholds, creating errors. Bit-sampling occurs near the end of a bit, so it is desirable that all signal reflections in a tap line be attenuated before or during the propagation delay segment to provide an adequate margin of safety.

Embodiments of the present invention provide techniques for reducing noise in a bus network, such as reducing/ suppressing signal reflection/ringing that may be implemented on CAN network and CAN FD network topologies to suppress signal disturbances and to improve the signal quality. In accordance with embodiments of the invention, a transition of a transceiver circuit from a first communication mode (e.g., a dominant state) to a second communication mode (e.g., a recessive state) is detected and in response to detecting a transition of the transceiver circuit from the first communication mode to the second communication mode, an output impedance of the transceiver circuit is controlled to be within a predefined range of an impedance value at the first communication mode while a differential driver voltage on a differential data bus decreases to a predefined voltage. For example, the output impedance of the transceiver circuit may be controlled to be within a certain percentage above or below the impedance value at the first communication mode (e.g., ±5%, ±10% or within other suitable value range of the impedance value at the dominant state) while the differential driver voltage on the differential data bus decreases to the predefined voltage (or below, as further described herein). The transition of the transceiver circuit from the first communication mode to the second communication mode may be detected by monitoring a TXD signal received at the transceiver circuit and identifying a signal edge of the TXD signal. By controlling the output impedance of the transceiver low ohmic (e.g., be within a certain percentage above or below the impedance value at the first communication mode) during the ramping down of the differential driver voltage, the energy dissipated into the network can be reduced, resulting in lower reflection on the bus. The bus reflection suppression technique is independent of the bus topology and bus data speed and can be applied to various bus topologies and bus data speeds.

Surprisingly, it has been discovered in connection with efforts behind the instant disclosure that driving the differential driver voltage on the differential data bus to the predefined voltage, such as to 0V, can result in asymmetry between the bus lines and the digital stream output by the differential receiver (e.g., R×D lines). For example, driving the differential driver voltage on the differential data bus to 0V in response to detecting the signal edge of TXD can result in a delay of the second communication mode edge (e.g., recessive bit edge) on the R×D line even though the differential bus line is at a voltage below the switching threshold of the differential receiver. In order to improve the throughput delay of the differential receiver and thereby improve symmetry, various embodiments involve expediting switching of the transceiver circuit from the first communication mode to the second communication mode in a threshold time in response to detecting a signal edge of a signal input (e.g., TXD) received at the differential driver. The preparation for expediting switching can mitigate unwanted delay of the related RXD receiver signal that is indicative of the second communication mode.

In specific embodiments, the switching of the transceiver circuit can involve minimizing a transition period of the differential receiver (e.g., the transition to the second communication mode). For example, the transceiver circuit switches to the second communication mode in response to detecting a signal edge by the differential driver and, in response, driving a differential driver voltage on a differential data bus to a voltage that overrides a predefined voltage or pre-conditioning the differential receiver for the transition to the second communication mode. And, while switching to the second communication mode, sense (control) circuitry can control an output impedance of the transceiver circuit to be within a predefined range of an impedance value at the first communication mode while the differential driver voltage on the differential data bus decreases to the voltage that overrides the predefined voltage.

In various embodiments, the differential driver drives the differential driver voltage on the differential data bus to a voltage that overrides a predefined voltage in response to the signal edge (e.g., TXD) of the signal input received at the differential driver. The predefined voltage can include or be lower than a receiver switching voltage of the differential receiver and the voltage driven on the differential data bus is lower, and in some embodiments, a negative voltage, than the predefined voltage. As an example, the differential driver can drive the differential driver voltage to the voltage that overrides the predefined voltage in response to the signal edge and for a first period of time, and to the predefined voltage that is greater than the voltage for a second period of time. The first period of time can be between 30-150 nanoseconds, in some specific examples.

In other embodiments, sense circuitry can be coupled to the TXD input to the differential driver. The sense (control) circuitry can be used to pre-condition the differential receiver for transitioning to the second communication mode responsive to detecting the signal edge of the input signal received at the differential driver. For example, the sense circuitry provides a signal to the differential receiver responsive to detecting the signal edge of the input signal received at the differential driver. The signal can include an offset to a receiver switching threshold and the differential receiver can provide a second communication mode output in response to the differential driver voltage exceeding the offset receiver threshold. In other embodiments, the signal is indicative of the transition of the transceiver circuit to the second communication mode, and the differential receiver outputs an RXD signal at a level associated with the second communication mode in response.

Various specific embodiments are directed to a bus system comprising a plurality of transceiver circuits coupled to a differential data bus. Each of the transceiver circuits include the above-described differential driver, differential receiver, and a microcontroller circuits and can provide TXD signals on the differential data bus, as further described herein.

Figure 1B:
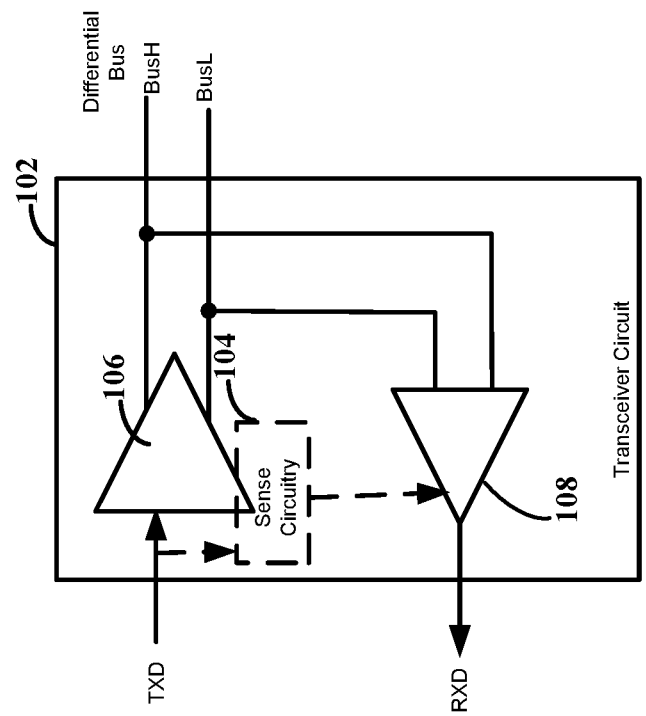

Turning now to the figures, FIGS. 1A-1B illustrate example apparatuses including transceiver circuits, in accordance with the present disclosure. An apparatus can include a differential data bus and one or more transceiver circuits coupled to the differential data bus. A transceiver circuit can form part of a node in a bus network as described above and is configured to send and receive data on the differential data bus. A bus network, such as a CAN network, can include multiple nodes as further illustrated and described by FIG. 4A. Each node is connected to a differential data bus that carries analog differential signals and can include a high bus line (BusH) and low bus line (BusL). The bus lines can form a twisted-pair cable having nominal cable impedance. As an example, the nominal cable impedance can include 120 ohms, 50 ohms, 130 ohms and various values between.

As described above, at least some nodes in the bus network may be un-terminated. For example, two or more nodes can have a termination resistor corresponding to the nominal cable impedance. The terminal resistance of the termination resistor can very as to their exact value based on real-word implementation. Each node of the bus network is coupled to both the BusH bus line and the BusL bus line via tap lines or wires. The nodes that are intermediate nodes can be un-terminated or optionally applied with high ohmic termination. Further, as further described below in connection with FIG. 4A, each node can include a microcontroller having an embedded protocol controller and a transceiver circuit. The microcontroller and the transceiver circuit can be connected between supply voltage, VCC, and ground, GND.

The microcontroller can be connected to at least one device, such as a sensor, actuator or other control device, and is programmed to interpret the received messaged and to generate appropriate outgoing messages. The microcontroller can include an embedded protocol controller that implements data link layer operations as is known in the field. For example, in receive operations, the protocol controller can store received serial bits from the transceiver circuit until an entire message is available for fetching by the microcontroller. The protocol controller can also decode the messages according to a standardized frame format of the specific protocol. In transmit operations, the protocol controller receives messages from the microcontroller and transmits the messages as serial bits in the data frame format to the transceiver circuit.

FIGS. 1A and 1B illustrate different example apparatuses that include transceiver circuits. Although not illustrated by FIGS. 1A-1B, the transceiver circuit is located between the microcontroller and the differential data bus, and implements physical layer operations. For example, in receive operations, the transceiver circuit converts analog differential signals from the differential data bus to serial digital signals that the protocol controller can interpret. The transceiver circuit also protects the protocol controller from extreme electrical conditions on the differential data bus, such as electrical surges. In transmit operations, the transceiver circuit converts serial digital bits received from the protocol controller into analog signals that are sent on the differential data bus.

As previously described, in various bus networks, the bus signaling is designed such that the differential bus signal is driven by the transceiver circuit with low ohmic drivers toward a certain positive differential voltage for one bit level (e.g., dominant) while the other bit level is achieved by a resistive bus termination impedance, with is relatively high ohmic (e.g., recessive). The recessive bus level can be reached with zero volts differential bus level. The according differential receiver is designed to have a switching threshold that is between the dominant and recessive differential bus level. As such, there can be issued with correctly transferring bits from the sender to the physical bus lines with accurate length representation and back converting these bits with accurate length at the receiver side. Certain protocols, such as CAN, may not allow for brute force transmission of bits to the bus because of protocol requirements allowing for override of the current bus level by other nodes at any time. The bus driver signals can be considered weak as they can be overridden by another node within the bit time. In order to achieve data transmission of particular bus speeds in the heterogeneous cable topologies, the protocol may dictate that the physical bits on the bus line be symmetrical with that on the bus receivers input RXD. If the bits degrade too much, the reading from the bus line communications get corrupted.

FIG. 1A illustrates an example of an apparatus including a differential data bus and a transceiver circuit 102. As illustrated, the transceiver circuit 102 includes a differential driver 106, a differential receiver 108, and, optionally, sense (control) circuitry 104. The transceiver circuit 102 can be connected to the differential data bus and can form part of a node of a bus network, as further illustrated herein. Both the differential driver 106 and the differential receiver 108 can communicate in the first communication mode and the second communication mode. For example, the differential driver 106 can be used to transmit differential signals on the bus lines that are indicative of data and/or of transition between the communication modes. The differential receiver 108 can monitor the differential signals on the bus lines and output a digital stream that is representative of the differential signals (e.g., output an RXD signal).

In specific embodiments, the differential driver 106 (e.g., the bus driver), is used to drive the bus signals from a first communication mode to a second communication mode (e.g., dominant to recessive) in a real wiring harness. The wiring harness can cause reflections because it is not an ideal transmission line. Each branch in a cable topology causes such reflections leading to a non-perfect differential bus signal. In specific embodiments, a TXD signal is driven to the differential data bus with the according differential voltage levels while the differential receiver 108 is converting back the differential signal to a digital RXD stream. In the case of CAN, the switching thresholds are described in the according CAN standard (ISO 11898-2:2016) to be between 0.5V and 0.9V differential. Consequently, the RXD output signal toggles when passing this threshold range as fast and accurately as possible to represent the differential bus signal with best symmetry performance.

Various embodiments are directed to more efficiently transitioning the nodes of the bus network between communication modes, such as recessive and dominant states. For faster speeds of transmitting data, a bus network can require symmetry between signals of the driver and receiver. In some instances, to increase the efficiency of the transition from a first communication mode to a second communication mode, an output impedance of the transceiver circuit 102 can be controlled by control circuitry, such as impedance control circuitry and/or sense circuitry 104, to be within a predefined range of an impedance value at the first communication mode (e.g., a dominant state), while a differential driver voltage on the differential data bus decreases to a predefined voltage. The predefined voltage can be below a switching threshold of the differential receiver 108, such as 0V. However, in accordance with various embodiments, it has been discovered that while driving the differential driver voltage on the differential data bus to the predefined voltage of 0V, the actual differential bus voltage can be higher than 0V during the transition from first communication mode to the second communication mode due to the impedance mismatch in the network. When the differential bus voltage is close to the differential receiver switching threshold, this can result in asymmetry between the bus lines and the RxD lines. That is, there is a delay of the second communication mode edge (e.g., recessive bit edge) on the RxD line even though the differential bus line is below the switching threshold of the differential receiver 108.

To improve the throughput delay of the differential receiver 108 and thereby improve symmetry, various embodiments include expediting switching of the transceiver circuit 102 from the first communication mode to the second communication mode in response to detecting the signal edge of the input signal received at the differential driver 106. The expediting switching can include configuring the differential driver 106 to drive the differential driver voltage on the differential data bus to a voltage that overrides the predefined voltage or pre-conditioning the differential receiver 108 for the transition to the second communication mode. The expediting switching can mitigate unwanted delay of the related RXD signal that is indicative of the second communication mode. Additionally, the preparation can minimize a transition period of the differential receiver 108.

In a number of embodiments, the differential driver 106 can drive a differential driver voltage on the differential data bus to a voltage that overrides/overshoots a predefined voltage. The override of the predefined voltage can be for a first period of time and the differential data bus can then be driven to the predefined voltage. While driving the differential data bus to both the overridden predefined voltage and the predefined voltage, the transceiver circuit (e.g., via control circuitry) can control an output impedance of the transceiver circuit 102 to be within a predefined range of an impedance value at the first communication mode (e.g., dominant state). That is, the controlled impedance can occur while a differential driver voltage on the differential data bus decreases to an overridden predefined voltage. For more general and specific information on controlling impedance, reference is made to U.S. patent application Ser. No. 15/681,363, entitled "Controller Area Network (CAN) Device and Method for Operating a CAN Device", filed on Aug. 19, 2017, which is fully incorporated herein by reference for its teaching. The overridden predefined voltage can have a different amplitude than the predefined voltage.

In a specific example, the differential driver 106 can drive a differential driver voltage on the differential data bus to a first voltage for a first period of time in response to detecting the signal edge, and to a second voltage that is greater than the first voltage for a second period of time. The second voltage is predefined for switching the differential receiver 108 from the first communication mode to the second communication mode. As the differential driver voltage is driven to the first voltage, which is less than the predefined voltage, the differential receiver 108 can expedite switching to the second communication mode and which can increase symmetry of driver signals in the bus network. In some specific embodiments, the first period of time can include, for example, 30-150 nanoseconds which can reduce or prevent impact on EME performance. In other specific and related examples, the first voltage can include a negative voltage, although embodiments are not so limited.

In other embodiments, the differential receiver 108 can be pre-conditioned for transitioning from the first communication mode to the second communication mode. The pre-conditioning can include the use of sense circuitry 104, which may form part of the transceiver circuit 102, that monitors a signal edge of the signal input received at the differential driver 106 (e.g., TXD), as further described herein in connection with FIG. 3. As illustrated by FIG. 1A and FIG. 1B, the sense circuitry can be part of the differential driver 106 (e.g., detects the signal edges) or separate from the differential driver 106 (e.g., detects the signal edge prior to input of the signal received at the differential driver 106).

FIG. 1B illustrates another example apparatus, in accordance with various embodiments. The apparatus includes a differential data bus and a transceiver circuit. The transceiver circuit 116 as illustrated by FIG. 1B can include a differential driver 120, differential receiver 122, and, optionally, sense circuitry 118, as previously described in connection with FIG. 1A. As illustrated, in some embodiments, the differential driver 120 and the differential receiver 122 are not limited to the differential lines as illustrated by FIG. 1A. The transceiver circuit 116 illustrated by FIG. 1B can function similarly to the transceiver circuit 102 illustrated by FIG. 1A, including the expediting switching of the transceiver circuit 116 from the first communication mode to the second communication mode in response to detecting a signal edge of the signal input received at the differential driver 120.

Figure 2A:
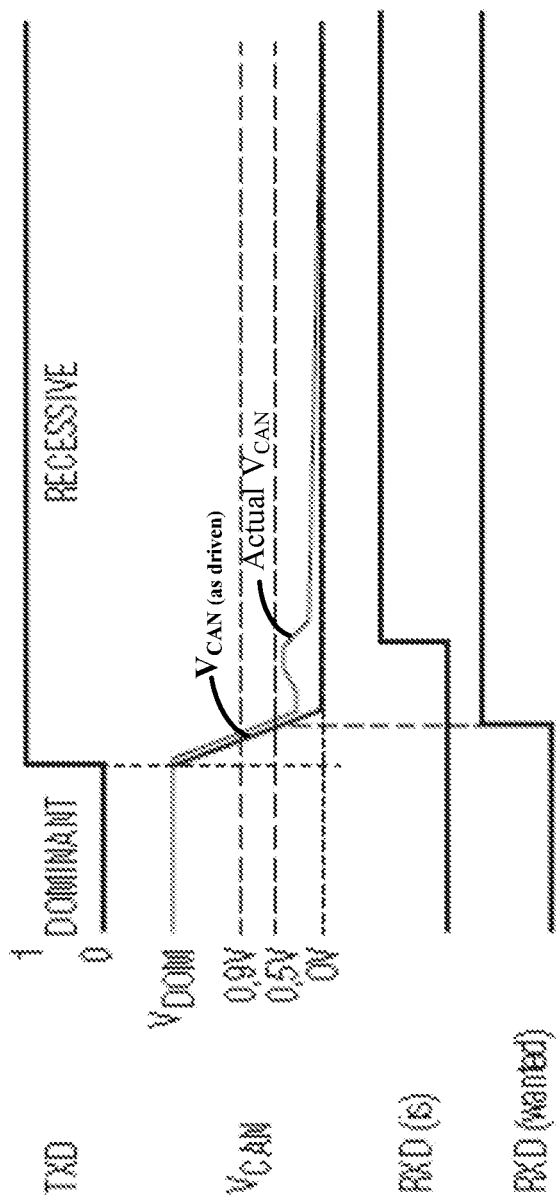
FIGS. 2A-2B illustrate example signal timing diagrams, in accordance with the present disclosure.
Figure 2B:
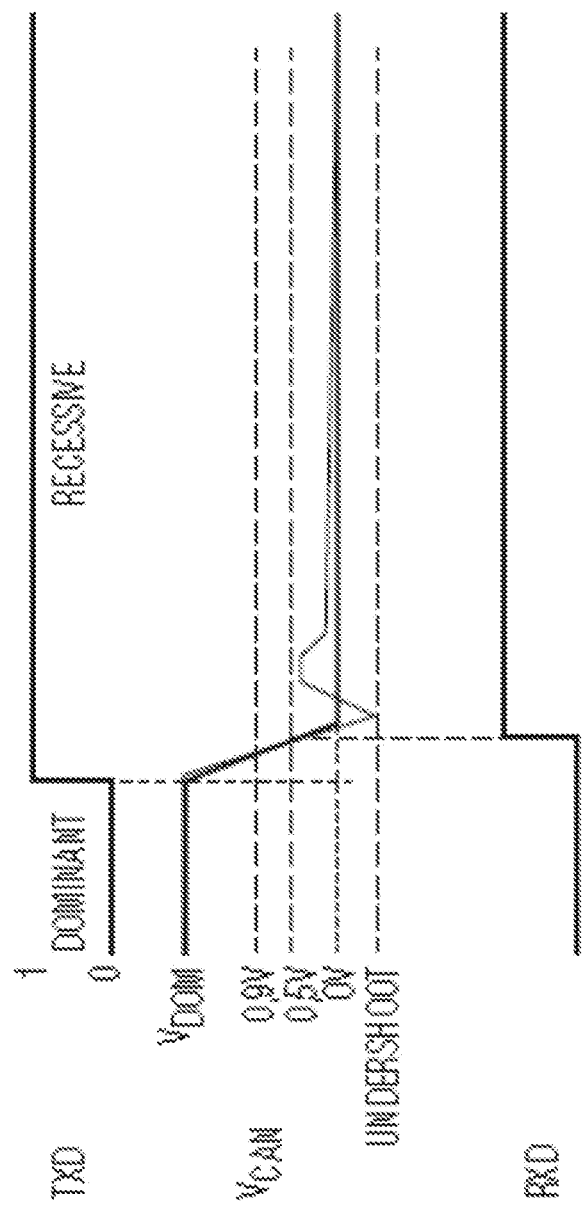

FIGS. 2A-2B illustrate example signal timing diagrams, in accordance with the present disclosure. For example, the bus levels illustrated by FIGS. 2A-2B illustrate examples values used to drive the bus levels in a CAN network. However, as may be appreciated, embodiments are not limited to a CAN network.

FIG. 2A illustrates an example signal timing diagram of a transceiver circuit when transitioning from a first communication mode to a second communication mode, such as transitioning from a dominant state to a recessive state, in accordance with various embodiments. As previously described, in some prior implementations, the recessive bus level on TXD is driven to the bus lines with a low impedance and a differential voltage of zero volts. The consequence of driving the bus lines to zero volt is that, in a real topology with reflections and lower impedances, the zero volts differential are not fully reached and a remaining bus voltage may stay higher (but below the receiver threshold, such as below 0.5V) for a while. Although that remaining differential voltage is below the switching threshold voltage for the differential receiver, it can result in a delayed response on the RXD signal, because the threshold of the differential receiver is only crossed marginally. The reaction speed of differential receiver can depend on the amplitude of the differential input voltage. The above-mentioned topology effects may prevent a significant differential voltage undershoot on the bus leading to an unwanted delay of the related RXD receiver signal.

More specifically, as illustrated by FIG. 2A, the line $V_{DOM}$ shows an example of the differential bus signal as driven on the bus lines and which does not directly reach the predefined voltage, which in this embodiment is zero volts. The differential bus signal is, however, driven below the switching threshold voltage for the differential receiver of 0.5V. The dashed lines illustrate example switching receiver threshold range, which can be according a protocol such as ISO 11898-2:2016. The line "RXD(is)" represents the RXD signal (e.g., as output by the differential receiver) as observed and the line "RXD(wanted)" represents the wanted the RXD signal. As illustrated, the RXD signal as observed is delayed as compared to the wanted RXD signal because threshold is passed with low undershoot.

Assuming a transition from a high differential voltage towards the zero volts differential is executed (dominant to recessive transition), the threshold of 0.5V in specific embodiments has to be passed reliably in order to cause or guarantee a toggle of the RXD signal. For optimum signal symmetry RXD need to react fast. In a real topology the physical signal transition does not ideally reach the 0V differential but may pass the 0.5V reliably leading to a slow reaction of the RXD signal as described above.

FIG. 2B illustrates example signal timing diagram when transitioning from a first communication mode to a second communication mode, in accordance with the present disclosure. As previously described, in order to obtained the wanted RXD response, the differential data bus is driven to a voltage value that is less than the predefined voltage, and optionally, even an inverse polarity, for a period of time (e.g., a rather short moment in time), which causes the differential receiver to switch faster as compared to driving to the predefined voltage, and with that, not degrading the symmetry anymore. If the overdrive is rather short, any impact on the overall system electromagnetic emission (EME) performance is mitigated or prevented and there is no impact or mitigated impact regarding the protocol rules, such as CAN protocol rules that require a single node to override this driver signal with a different amplitude during the bit time.

As may be appreciated, embodiments are not limited to reaching a real inverse polarity below 0V. It is about passing the receiver threshold voltage regardless of the used wiring harness reliably with a fair amount of undershoot (below the 0.5V).

Figure 3:
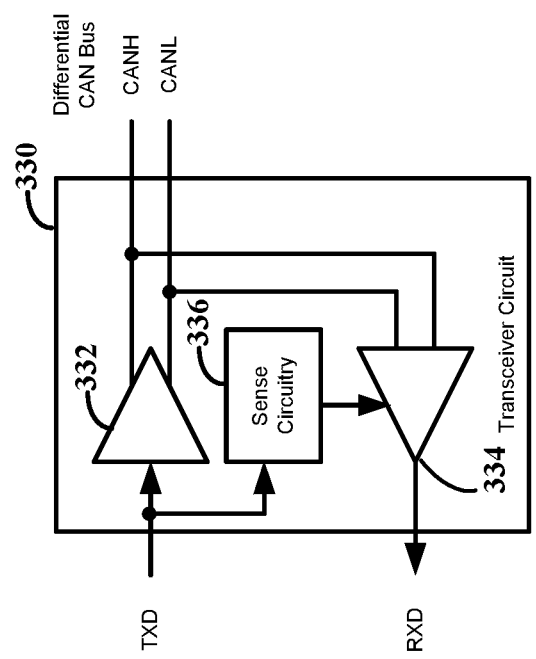
FIG. 3 illustrates an example apparatus including a transceiver circuit, in accordance with the present disclosure.

FIG. 3 illustrates an example apparatus including a differential data bus and a transceiver circuit, in accordance with the present disclosure. The transceiver circuit 330 can include a differential driver 332, a differential receiver 334, and, optionally, sense circuitry (although not illustrated), as previously described by the transceiver circuit 102 of FIG. 1A. In some embodiments, the transceiver circuit 330 expedites switching from the first communication mode to the second communication mode in response to detecting a signal edge of a signal input received at the differential driver 332. For example, the transceiver circuit 330 can include sense circuitry 336. The sense circuitry 336 can provide a signal to the differential receiver 334 responsive to detecting the signal edge of the signal input received at the differential driver 232.

The sense circuitry 336 can provide the signal in response to detecting a transition from 0 to 1 on TXD. For example, the sense circuitry 336 can monitor the signal input received at the differential driver 332 and, therefrom, identify the signal edge. In specific embodiments, the signal can include a TXD signal as received at the transceiver circuit 330. The signal edge can indicate a transition of the transceiver circuit 330 from the first communication mode to the second communication mode. Responsive to detecting the transition and/or signal edge, the sense circuitry 336 can provide a signal to the differential receiver 334 that preconditions the differential receiver 334 for the transition. The sense circuitry 236 can force the differential receiver 334 towards the according signal on RXD. This "forcing" may be done by adding an offset to the differential receiver 334 (e.g., receive) switching threshold or even directly toggling the output level through direct control of the output stage of the differential receiver 334. The length of conditioning can be adapted to the requirements coming from the bus speed and the individual topology response.

In specific embodiments, the signal from the sense circuitry 336 can include an offset to the differential driver (e.g., receiver) switching threshold or can be indicative of the output signal to be provided by the differential receiver 334. For example, the differential receiver 334 can respond to the offset by outputting a signal (e.g., RXD signal) representative of the differential driver voltage, which is on the differential data bus, responsive to the differential driver voltage exceeding the offset receiver threshold (e.g., the receiver threshold plus the offset). More specifically, the differential driver voltage exceeding the offset receiver threshold causes switching of the differential receiver 334 from the first communication mode to the second communication mode (e.g., RXD signal indicative of the second communication mode). In other embodiments, the differential receiver 334 can respond to the signal from the sense circuitry 336 by providing the output signal (e.g., RXD signal indicative of the second communication mode that is directly controlled by the sense circuitry 336).

In such embodiments, the differential receiver 334 is directly influenced by the TXD signal inside the transceiver circuit 330 and the acceleration is not physically visible on the differential data bus. With this, the impact on EME may be lower than the embodiment described above in connection with FIG. 1A, as the TXD signal is internal to the transceiver circuit 330 and use of the internal TXD signal as an "accelerating signal" inside of the differential receiver 334, which is generating the RXD signal. Since TXD can be running timing wise ahead of RXD, there is time internally to the transceiver circuit 330 to condition the differential receiver 334 towards the wanted RXD signal. As a result, the same RXD acceleration can be achieved without being visible on the bus lines.

Figure 4A:
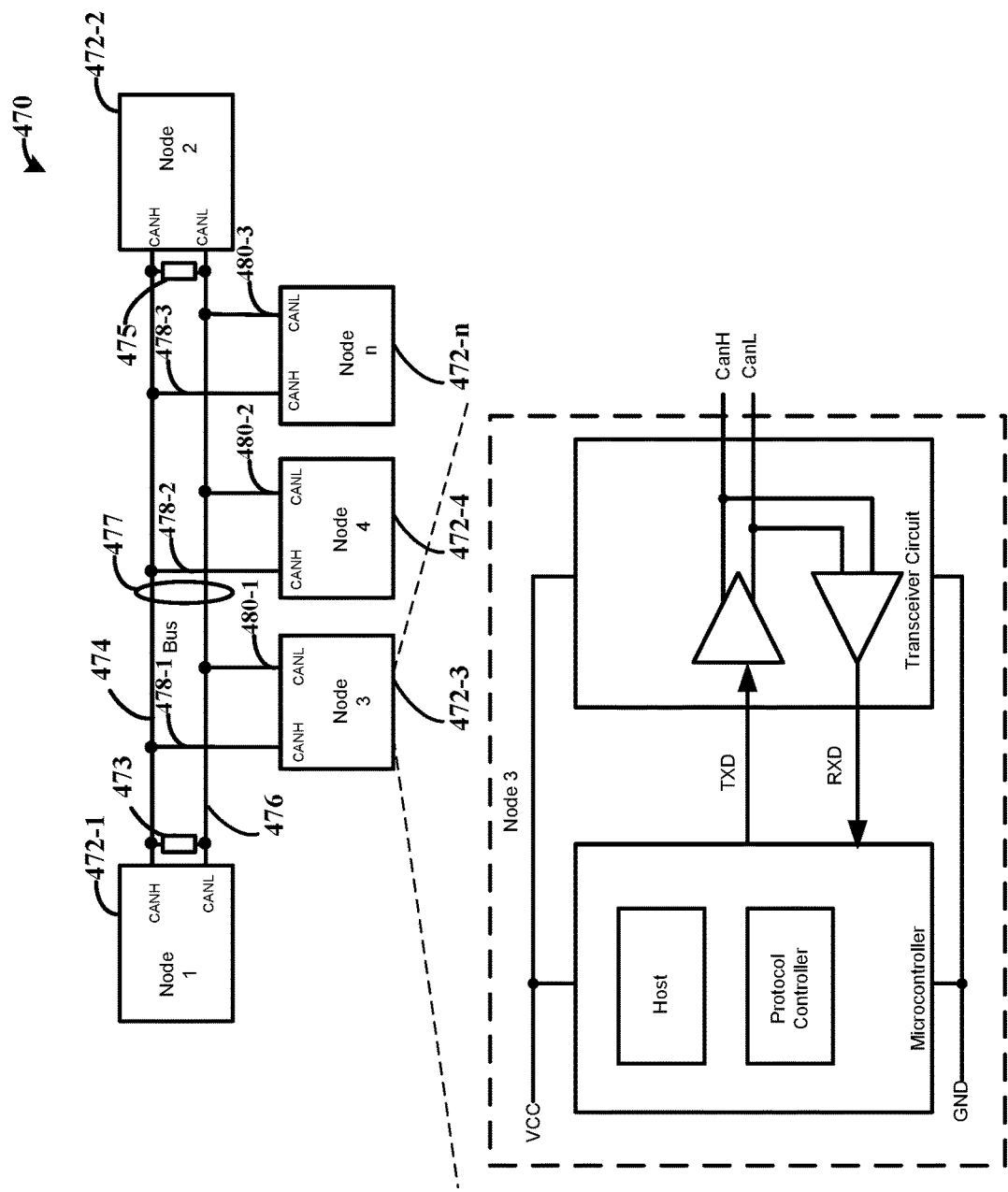
FIGS. 4A-4B illustrate an example bus network, in accordance with the present disclosure.
Figure 4B:
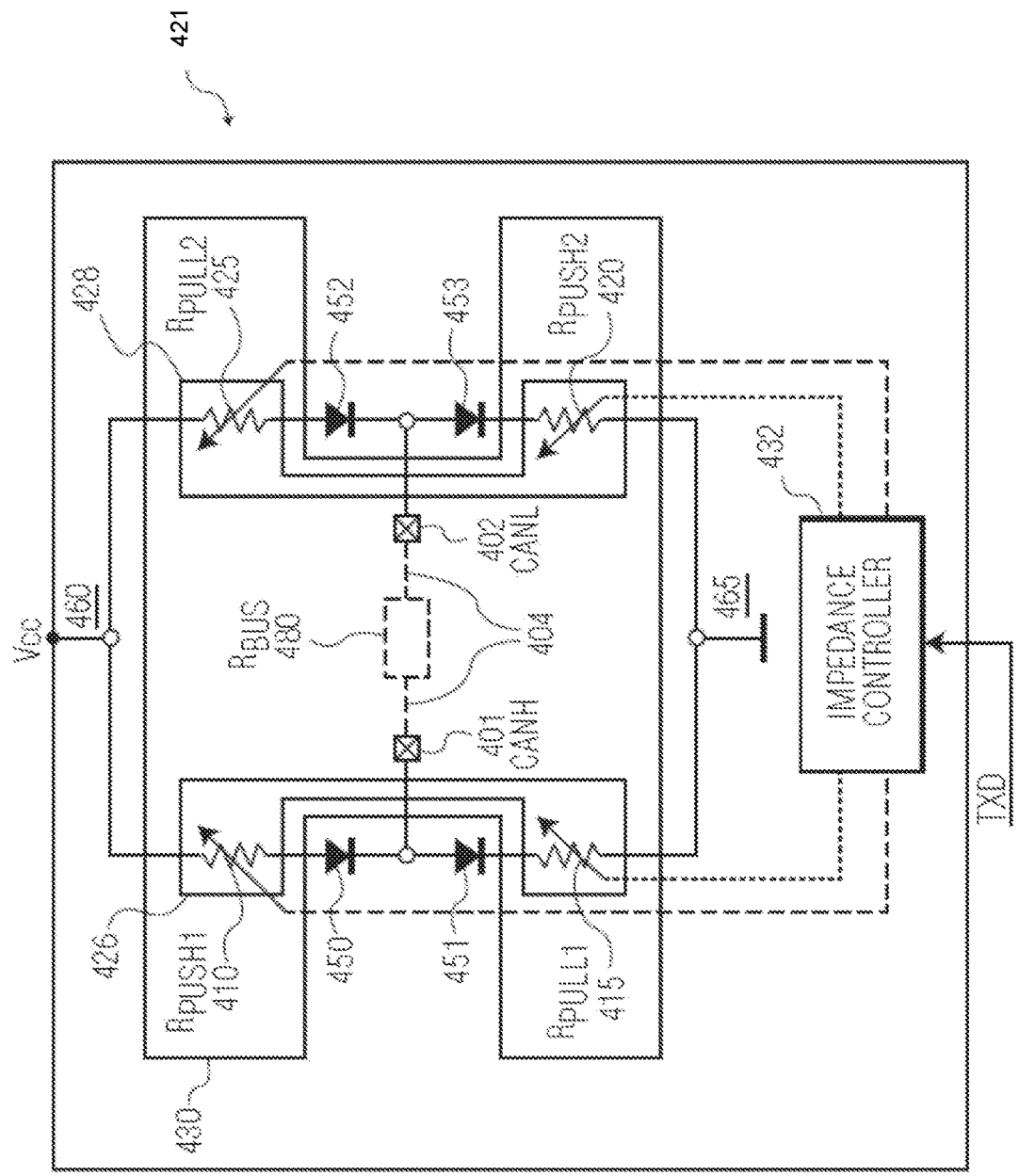

FIG. 4A-4B illustrates examples of a bus network in accordance with specific embodiments. More specifically, FIG. 4A illustrates an example bus network that includes a plurality of nodes, in accordance with the present disclosure. The specific bus network illustrated by FIG. 4A includes a CAN network 470, however, embodiments are not so limited. The CAN network 470 can include multiple CAN nodes 472-1, 472-2, 472-3, 472-4, 472-n (where n is a positive integer), also referred to as "ECUs," each connected to a CAN bus 477. The CAN bus 477 carries analog differential signals and includes a CAN high (CANH) bus line/wire 474 and a CAN low (CANL) bus line/wire 476. The CAN bus is known in the field. In some embodiments, the CAN bus lines 474 and 476 form a twisted-pair cable having a nominal cable impedance. In some embodiments, the nominal cable impedance is 120Ω or other suitable impedance value within a specific range (e.g., between 50Ω and 130Ω), which is typical of some automotive applications of the CAN bus. It will however be appreciated that embodiments are applicable to other line impedances and the present application should not be understood to be limited to a specific nominal cable impedance. It will also be appreciated that the exact impedance of the CAN bus may be affected by physical factors such as the cable and/or isolation material. While CAN bus line impedance is assumed to be a specific impedance value a specific range (e.g., between 50Ω and 130Ω), the actual CAN bus impedance may vary around this value and can be considered to be approximately (e.g., ±5%) the specific impedance value. Although the CAN network 470 shown in FIG. 4A includes five CAN nodes, in other embodiments, the CAN network includes less than five CAN nodes or more than five CAN nodes.

The CAN node 472-1 has a termination resistor 473 corresponding to the nominal cable impedance. The CAN node 472-2 has a termination resistor 475 corresponding to the nominal cable impedance. Termination resistances of the termination resistors may vary as to their exact value due to real-world implementation. Each of the CAN nodes 472-3, 472-4, 472-n is coupled to the CANH bus line 474 and the CANL bus line 476 via tap lines/wires 478-1, 478-2, 478-3, 480-1, 480-2, 480-3. The CAN node 472-3, 472-4, 472-n are intermediate nodes that may be un-terminated or optionally applied with a high ohmic termination in the kilo-Ohms range in some systems. In some examples, high ohmic termination may provide limited ringing suppression at these quasi open ends of the cable, but the effectiveness is very limited due to the deviation from the nominal cable impedance.

FIG. 4A also illustrates an example embodiment of one of the CAN nodes 473-3 of the CAN network 470 depicted in the CAN network. In the embodiment, a CAN node 473-3 (e.g., each node) includes a microcontroller having an embedded CAN protocol controller and a transceiver circuit. In some embodiments, the microcontroller may also include a host, which may be, for example, a software application that is stored in memory of the microcontroller and executed by processing circuits of the microcontroller. The microcontroller and the transceiver circuit of the CAN node may be connected between a supply voltage, VCC, and ground, GND. The CAN node depicted in FIG. 4A is a possible implementation of one of the nodes depicted in FIGS. 1A-1B and 3. However, the nodes depicted in FIGS. 1A-1B and 4A can be implemented differently from the CAN node depicted in FIG. 4A.

The microcontroller is typically connected to at least one device (not shown) such as a sensor, an actuator, or some other control device and is programmed to interpret the received messages and to generate appropriate outgoing messages. The microcontroller, also referred to as a host processor, a host, or a digital signal processor (DSP), is known in the field. The CAN protocol controller, which can be embedded within the microcontroller or external to the microcontroller (e.g., a separate IC device), implements data link layer operations as is known in the field. For example, in receive operations, the CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN data frame format to the CAN transceiver.

The transceiver circuit is located between the microcontroller and the CAN bus 477 and implements physical layer operations. For example, in receive operations, the transceiver circuit converts analog differential signals from the CAN bus 477 to serial digital signals that the CAN protocol controller can interpret. The transceiver circuit also protects the CAN protocol controller from extreme electrical conditions on the CAN bus 477, e.g., electrical surges. In transmit operations, the CAN transceiver converts serial digital bits received from the CAN protocol controller into analog differential signals that are sent on the CAN bus.

As illustrated in FIG. 4A, data communicated from the microcontroller to the transceiver circuit is identified as TXD and data communicated from the CAN transceiver to the microcontroller is referred to as RXD. The transceiver circuit is connected to the microcontroller via a TXD path and a RXD path. Specifically, TXD is carried on the TXD path and RXD is carried on the RXD path. Data is communicated to and from the CAN bus via the CANH and CANL bus lines 474 and 476, respectively. As noted above, the CAN protocol controller can be configured to support the normal mode or the flexible data rate mode. As used herein, "CAN normal mode" (also referred to as "Classical CAN mode") refers to frames that are formatted according to the ISO 11898-1:2003 standard and "CAN FD mode" refers to frames that are formatted according to the International Standard 11898-1:2015 standard, or an equivalent thereof. In some embodiments, the CAN node is coupled to the CAN bus through one or more tap lines. In other embodiments, the CAN node is coupled directed to the CAN bus wires 474, 476.

In some embodiments, the microcontroller determines messages that are to be transmitted on the CAN bus 477 and provides these to the CAN protocol controller. The microcontroller may receive messages from the transceiver circuit and interpret the received messages. The CAN protocol controller may receive bits from the CAN bus 477 (via the CAN transceiver) and reconstruct the bits into a message to be interpreted by the microcontroller. The CAN controller may receive a message from the microcontroller and provide the message as serial bits to the bus via the transceiver circuit. The transceiver circuit may convert the digital data bits on the TXD path from the CAN protocol controller into analog bus signals. The transceiver circuit may convert analog bus signals into digital bits to be provided via the RXD path to the CAN protocol controller.

Each of the CAN node 472-1 and the CAN node 472-2 has a termination resistance $R_{Term}$ "T" according to the nominal cable impedance such as 120Ω. When, for instance, one of the CAN nodes 472-3, 472-4, 472-$n$ that is further away from the termination resistors at the CAN nodes 472-1 and 472-2 starts sending data, reflections in the network may cause signal disturbances. In general, reflections in the CAN network 470 may be caused by the open tap lines and the star points in the CAN cable harness regardless which CAN node is sending data (including terminated CAN nodes 472-1 and 472-2). A CAN FD controller may sample the bus, for instance, at 70% of bit time. If the duration of the signal disturbance is longer than the typical sampling time, erroneous bit information may be captured, which may result in a corrupted data message. By using a longer bit time, the problem of signal disturbance may be mitigated. However, the maximum data transmission rate of the network may be reduced. Reflections due to tap lines that are too long are a limiting factor for transmission rate when using network topologies developed for the classic CAN protocol at a transmission rate of, e.g., 500 kb/s, also for the more recent CAN FD protocol, which specifies transmission data rates from 1 MBit/s to 5 MBit/s or even higher. Further, it should be considered that even with a well-terminated network, high capacitance bus loading may also negatively impact the transmission rate. In the case of a high number of CAN nodes connected to the CAN network 450, the dominant to recessive transitions becomes very slow. Besides the capacitive impact, the cable impedance may vary with temperature resulting in a non-matched bus termination which again causes reflections even at the terminated ends of a CAN network 470. In the recessive state the transmitter is high ohmic. When each connected node adds a capacitance of, for instance, a maximum of 100 pF to the CAN bus 477 and the CAN bus impedance is fixed at 60Ω, the dominant to recessive transition will not be faster than approximately 100 ns in the case of a network to which ten nodes are connected. The more CAN nodes are connected to the CAN bus lines, the higher the overall capacitance will be and the longer the recessive bit transition will take. For complex topologies, the successful recessive bit transition reaching a reliable recessive bit level at all nodes may take several 100 ns up to e.g., 1 μs including all ringing effects. If it is desirable to have a transmission rate of 5 MBit/s or higher, the bit time is 200 ns, 30 which may be shorter than the bit transition time and may cause communication failures.

Under typical signal reflection/ringing conditions, the implementation of the CAN network 470 may be limited by certain parameters in order to reduce signal reflection/ringing and to protect the integrity of the signaled data at higher data rates. For example, the CAN bus 477 may have a maximum length at which maximum data rates may be achieved. In another example, the tap lines connecting the CAN nodes to the CAN bus may be kept as short as possible to reduce reflections. However, the length of the bus and the tap lines may be subject to other factors and it may not always be possible to have tap lines that are as short as desired. For example, in an automotive application, the implementation of the CAN network may be governed by the shape and size of a vehicle and the position of the CAN nodes. Furthermore, even in the case where the tap lines are as short as is practical, ringing may still occur at higher data rates. The signal reflection/ringing in the un-terminated tap lines may corrupt the communication on the CAN bus, which can become more of a problem with CAN FD protocols where the data rate is higher. One way to address ringing is to redesign the network topology to improve termination, which can be time consuming and costly. Typically, the maximum bus length is determined by, or rather is a trade-off with the selected signaling rate and the signaling rate decreases as the transmission distance increases. While steady-state losses may become a factor at the longest transmission distances, the main factors limiting signaling rate as distance is increased are time varying. Cable bandwidth limitations, which degrade the signal transition time and introduce inter-symbol interference (ISI), are primary factors reducing the achievable signaling rate when transmission distance is increased. For a CAN bus, the signaling rate is also determined from the total system delay—down and back between the two most distant nodes of a system and the sum of the delays into and out of the nodes on a bus with the typical, e.g., 5.5 ns/m, propagation delay of a twisted-pair cable. Also, consideration should be given the signal amplitude loss due to impedance of the cable and the input transceiver impedance. Since tap lines are un-terminated, signal reflections can develop in a tap line that drive signal levels back and forth across a receiver's input thresholds, creating errors. Bit-sampling occurs near the end of a bit, so it is desirable that all signal reflections in a CAN tap line be attenuated before or during the propagation delay segment to provide an adequate margin of safety.

Embodiments of the present invention provide techniques for reducing noise in a bus system, such as reducing/suppressing signal reflection/ringing that may be implemented on CAN network and CAN FD network topologies to suppress signal disturbances and to improve the signal quality. In accordance with embodiments of the invention, a transition of a CAN transceiver of the CAN device from a dominant state to a recessive state is detected and in response to detecting a transition of the CAN transceiver from the dominant state to the recessive state, an output impedance of the CAN transceiver is controlled to be within a predefined range of an impedance value at the dominant state while a differential driver voltage on a CAN bus connected to the CAN transceiver decreases to a predefined voltage, or, in some embodiments, decreases to a value below the predefined voltage followed by the predefined voltage. For example, the output impedance of the CAN transceiver may be controlled to be within a certain percentage above or below the impedance value at the dominant state (e.g., ±5%, ±10% or within other suitable value range of the impedance value at the dominant state) while the differential driver voltage on the CAN bus decreases to the predefined voltage or below. The transition of the CAN transceiver of the CAN device from the dominant state to the recessive state may be detected by monitoring a transmit data connection (TXD) signal received at the CAN transceiver and identifying a signal edge of the TXD signal. By controlling the output impedance of the CAN transceiver low ohmic (e.g., be within a certain percentage above or below the impedance value at the dominant state) during the ramping down of the differential driver voltage, the energy dissipated into the network can be reduced, resulting in lower reflection on the bus. The CAN bus reflection suppression technique is independent of the bus topology and bus data speed and can be applied to various bus topologies and bus data speeds.

FIG. 4B illustrates an example of a transceiver circuit in accordance with various embodiments. In some specific embodiments, the transceiver circuit 421 of a node in a bus network, such as the CAN network 470 illustrated by FIG. 4A, can include an impedance bridge 430 and control circuitry (which may include an impedance controller 432 and/or the previously described sense circuitry). The control circuitry (e.g., impedance controller 432) can control the impedance bridge 430 of the transceiver (based on TXD signal received). By controlling the impedance bridge 430, the impedance of the transceiver circuit 421 can be adjusted independently of the signal response at the bus 404. Consequently, the signal reflection/ringing at the bus can be reduced or suppressed through the controlled impedance. The transceiver circuit 421 depicted in FIG. 4B is a possible implementation of the transceiver circuit depicted in FIGS. 1A-1B and 3. However, the transceiver depicted in FIGS. 1A-1B and 3 can be implemented differently from the transceiver depicted in FIG. 4B.

In more specific and detailed embodiments, as depicted by FIG. 4B, the impedance bridge 430 is connected to CANH and CANL terminals 401, 402, which in turn are coupled to tap lines, respectively, and further to the CANH bus wire and CANL bus wire, such as illustrated by FIGS. 1A-1B, 3, and 4A. The impedance bridge 430 includes a first leg 426, which is also referred to as CANH (side) leg, and a second leg 428, which is also referred to as CANL (side) leg. Each leg includes two controllable impedances with impedance properties (e.g., adjustable capacitors, adjustable resistors, and/or adjustable inductors), which can be dynamically adjustable for instance by the control circuitry (e.g., the impedance controller 432). The CANH leg includes a push impedance unit 410 (e.g., implemented as a push resistor $R_{PUSH1}$), which is connected between a common voltage supply rail VCC 460 and the CANH terminal 401, and a pull impedance unit 415 (e.g., implemented as a pull resistor $R_{PULL1}$), which is connected between the CANH terminal 401 and a common ground rail 465. The CANL leg includes a pull impedance unit 425 (e.g., implemented as a pull resistor $R_{PULL2}$), which is connected between the common voltage supply rail VCC and the CANL terminal, and a push impedance unit 420 (e.g., implemented as a push resistor $RP_{USH2}$), which is connected between the CANL terminal 402 and the common ground rail. Although the impedance units 410, 415, 420,425 are implemented as resistors in the embodiment illustrated by FIG. 4B, in other embodiments, at least one of the impedance units 410, 415, 420,425 may be implemented as one or more transistors (MOSFET transistors or bipolar transistors), one or more adjustable capacitors, one or more adjustable inductors, or a combination of one or more adjustable resistors, one or more capacitors, and/or one or more adjustable inductors. In some embodiments, at least one of the push resistors, $R_{PUSH1}$ and $R_{PUSH2}$, and the pull resistors, $R_{PULL1}$ and $R_{PULL2}$, is implemented as a resistor ladder or other adjustable resistor network and the control circuitry (e.g., impedance controller 432) can adjust the resistance value of at least one of the push resistors, $R_{PUSH1}$ and $R_{PUSH2}$, and the pull resistors, $R_{PULL1}$ and $R_{PULL2}$, (e.g., by controlling switches (e.g., MOSFET transistors or other active semiconductor devices) within a resistor ladder or other adjustable resistor network to connect or bypass a resistor component). The legs may have a symmetrical resistor configuration with respect to the CANH and CANL terminals. The CAN bus 404 has a load impedance 480 represented by the equivalent bus impedance, $R_{BUS}$. Typically, the bus impedance $R_{BUS}$ has an impedance of approximately 60Ω in accordance with the above described typical nominal cable impedance of 120Ω provided that the CAN bus is terminated with termination resistance $R_{Term}=120\Omega$ at each end. In some embodiments, diodes 450, 451, 452, 453 may be connected in series with each of the impedance units 410, 415, 420, 425 in order to prevent reverse currents from flowing from the CAN bus into the common voltage supply rail and into the common ground rail in the case that a bus voltage that is higher than the supply voltage potential Vcc is present on the common voltage supply rail or a bus voltage that is lower than a ground potential is present on the common ground rail. In some embodiments, other schemes are used to prevent reverse currents flowing from the CAN bus into the common voltage supply rail and into the common ground, e.g., a diode in series with the common supply rail 460 and a diode in series with the common ground rail 465.

In some embodiments, the impedance values of the adjustable push resistors $R_{PUSCH1}$ and $R_{PUSH2}$ and the adjustable pull resistors $R_{PULL1}$ and $R_{PULL2}$ are dynamically adjustable based on two parameters x and y. The domain of the parameter x may comprise the value range x=(0, 1), where x=(0, 1)={x∈$\mathcal{R}$, 0<x<1}, and the domain of the parameter y may comprise the value range y=(0, 25 2], where y=(0, 2]={y∈$\mathcal{R}$, 0<y≤2}. The parameters x and y are independent of each other. The push impedance value $Z_{PUSH}$ of the push resistors $R_{PUSCH1}$ and $R_{PUSH2}$ can be expressed as:

$$Z_{push} = \frac{R_f}{x*y} \quad (1)$$

where $R_f$ represents a reference resistance value. The pull impedance value $Z_{PULL}$ of the adjustable pull resistors $R_{PULL1}$ and $R_{PULL2}$ can be expressed as:

$$Z_{pull} = \frac{R_f}{(1-x)*y} \quad (2)$$

The total differential impedance of the impedance bridge 430, which is also the driver impedance $Z_{CAN}$ of the CAN transceiver 421, can be expressed as:

$$Z_{CAN} = 2*\frac{1}{\frac{1}{Z_{push}}+\frac{1}{Z_{pull}}} \quad (3)$$

$$Z_{CAN} = 2*\frac{R_f}{y} \quad (3)$$

The total differential impedance of the impedance bridge 430, which is the driver impedance, $Z_{CAN}$, of the CAN transceiver 421, can be dynamically adjusted to any impedance value between a low ohmic state, which is herein determined by a lowest driver impedance value $Z_{CAN}=R_f$, and a high ohmic state, which is herein represented by $Z_{CAN}=\infty$. $R_f$ is the minimum drive impedance value of the CAN transceiver 421. For instance, the minimum drive impedance value may be $R_f=15\Omega$. It should be noted that a high ohmic state, referred herein by $Z_{CAN}=00$, may comprise a maximum drive impedance value in the range of kilo Ohms or mega Ohms. The driver impedance, $Z_{CAN}$, needs to be high ohmic compared to the equivalent bus impedance, $R_{BUS}$, in order to allow the differential bus impedance to reach the nominal value of e.g., 60 Ohms again at the end of a slow bit time. Consequently, the factor between the maximum drive impedance and the minimum drive impedance may be in the range of e.g., thousand or more.

The control circuitry, such as the illustrated impedance controller 432, may be implemented as a processor, such as a microcontroller. In some embodiments, the control circuitry includes sense circuitry (e.g., a signal edge detector circuit). In some embodiments, the control circuitry and/or sense circuitry is configured to detect a transition of the CAN transceiver 421 from a dominant state to a recessive state and in response to detecting a transition of the CAN transceiver 421 from the dominant state to the recessive state, control an output impedance of the impedance bridge (e.g., the impedance measured between the CANH and CANL terminals 401, 402) to be within a certain percentage above or below the impedance value at the dominant state (e.g., by simultaneously adjusting the impedance configuration of the push resistors, $R_{PUSH1}$ and $R_{PUSH2}$, and the pull resistors, $R_{PULL1}$ and $R_{PULL2}$ such that the output impedance of the impedance bridge 430 to be within a certain percentage above or below the impedance value at the dominant state while the differential output voltage decreases to a predefined voltage) while the differential driver voltage on the CAN bus 404 (e.g., the different voltage measured between the CANH and CANL terminals 401, 402) connected to the CAN transceiver 421 decreases to a predefined voltage (e.g., 0V or other suitable voltage level). For example, the output impedance of the CAN transceiver 421 may be controlled to be ±5%, ±10% or within other suitable value range of the impedance value at the dominant state while the differential driver voltage on the CAN bus 404 decreases to the predefined voltage. In some embodiments, the output impedance of the CAN transceiver 421 is controlled to be at a fixed impedance while the differential output voltage decreases to a predefined voltage and/or to a value below the predefined voltage (followed by the predefined voltage). By controlling the output impedance of the CAN transceiver 421 to be within a certain percentage above or below the impedance value at the dominant state during the ramping down of the differential driver voltage, the energy dissipated into the CAN network can be reduced, resulting in lower reflection on the CAN bus 404, under various CAN bus topologies and data speeds. The control circuitry may detect the transition of the CAN transceiver 421 from the dominant state to the recessive state by monitoring the transmit data connection (TXD) signal received from the TXD path 457 at the CAN transceiver 421 (e.g., from the microcontroller). For example, the control circuitry may detect the transition of the CAN transceiver 421 from the dominant state to the recessive state by identifying a signal edge of the TXD signal. An active CAN transceiver (i.e., a CAN transceiver in the dominant state) drives the CAN bus waveform to a "dominant" state, represented as a logic low level (logic zero) of the TXD signal. An inactive transceiver (i.e., a CAN transceiver in the recessive state) removes its differential output voltage from the CAN bus, represented as a logic high level (logic one) of the TXD signal. Although specific logic levels of the TXD signal are described, in other networks, other signal logic levels may be used.

In some embodiments, the control circuitry (e.g., the impedance controller 432) is configured to control the resistance values of the adjustable push resistors, $R_{PUSH1}$ and $R_{PUSH2}$, and the adjustable pull resistors, $R_{PULL1}$ and $R_{PULL2}$, of the impedance bridge while the differential driver voltage on the CAN bus decreases to the predefined voltage. In an embodiment, during a positive/rising or negative/falling signal edge of the TXD signal, the control circuitry may adjust the resistance values of one or more of the adjustable push resistors, $R_{PUSH1}$ and $R_{PUSH2}$, and the adjustable pull resistors, $R_{PULL1}$ and $R_{PULL2}$. For example, during a dominant (falling) edge of the TXD signal, control circuitry may adjust the resistance values of the adjustable push resistors, $R_{PUSH1}$ and $R_{PUSH2}$, while keep the resistance values of the adjustable pull resistors, $R_{PULL1}$ and $R_{PULL2}$, static high ohmic to be within a certain percentage above or below the impedance value at the dominant state. In another example, during a recessive (rising) edge of the TXD signal, the control circuitry may adjust the resistance value of each of the adjustable push resistors, $R_{PUSCH1}$ and $R_{PUSH2}$, and the adjustable pull resistors, $R_{PULL1}$ and $R_{PULL2}$, individually with different slopes in order to keep the overall impedance of the impedance bridge to be within a certain percentage above or below the impedance value at the dominant state.

In some embodiments, the control circuitry (e.g., the impedance controller 432) is configured to increase the output impedance of the CAN transceiver 421 (e.g., the impedance measured between the CANH and CANL terminals 401, 402) while the differential driver voltage on the CAN bus 404 (e.g., the different voltage measured between the CANH and CANL terminals 401, 402) is kept at the predefined voltage, and after bring the differential voltage to the value below the predefined voltage (or otherwise preconditioning the receiver). Because the CAN bus voltage is kept at the predefined voltage (e.g., 0V) or temporarily brought below the predefined voltage (e.g., -V) while the output impedance of the CAN transceiver is increased, the impedance change will not result in large amount of energy dissipating into the CAN network and thus reduce or prevent a new reflection on the CAN bus. For example, at least one of the push resistors, $R_{PUSH1}$ and $R_{PUSH2}$, and the pull resistors, $R_{PULL1}$ and $R_{PULL2}$, may be implemented as a resistor ladder or other adjustable resistor network and the control circuitry can increase the resistance value of at least one of the push resistors, $R_{PUSH1}$ and $R_{PUSH2}$, and the pull resistors, $R_{PULL1}$ and $R_{PULL2}$, (e.g., by controlling switches within a resistor ladder or other adjustable resistor network to connect a resistor component). The control circuitry (e.g., impedance controller) may increase the output impedance of the CAN transceiver to be equal to a characteristic impedance of the CAN bus or to a predefined impedance value that is close to characteristic impedance of the CAN bus (e.g., ±5%, ±10% or within other suitable value range of the characteristic impedance of the CAN bus) while the differential driver voltage on the CAN bus is kept at the predefined voltage and/or temporarily brought below the predefined voltage. In some embodiments, control circuitry increases the output impedance of the CAN transceiver to be equal to a characteristic impedance of the CAN bus or to a predefined impedance value that is lower or higher than the characteristic impedance of the CAN bus before a data sample point to avoid data sample error. In some embodiments, the control circuitry increases the output impedance of the CAN transceiver to be equal to a characteristic impedance of the CAN bus while the differential driver voltage on the CAN bus is kept at the predefined voltage and subsequently, increases the output impedance of the CAN transceiver from the characteristic impedance of the CAN bus to a high ohmic value while the differential driver voltage on the CAN bus is kept at the predefined voltage.

Figure 5:
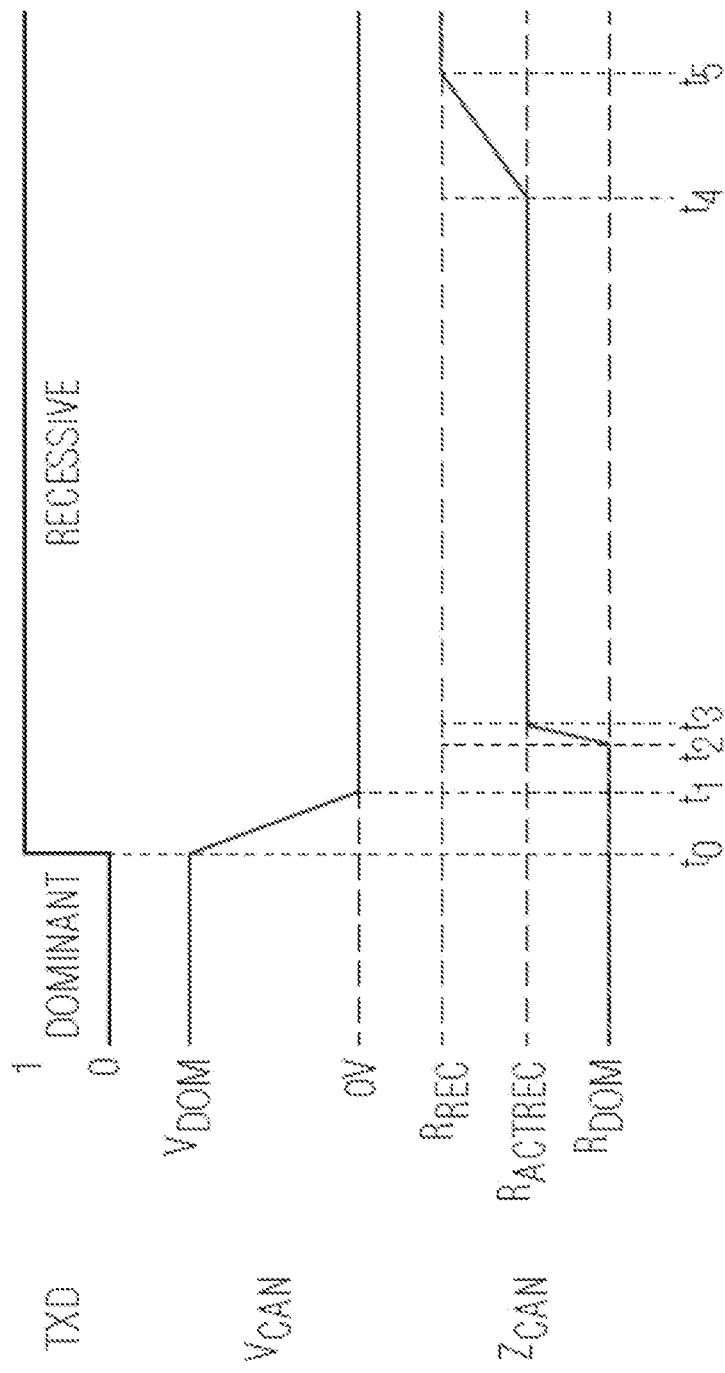
FIG. 5 illustrates a signal timing diagram of the CAN transceiver depicted in FIG. 4B, in accordance with the present disclosure.

FIG. 5 illustrates an example signal timing diagram of the CAN transceiver depicted in FIG. 4B, in accordance with various embodiments. In the signal timing diagram, the driver impedance, "$Z_{CAN}$," of the impedance bridge (e.g., the impedance measured between the CANH and CANL terminals 401, 402 of FIG. 4B) is controlled by the control circuitry (e.g., the impedance controller 432 illustrated by FIG. 4B) to switch between a dominant impedance level, "$R_{DOM}$," an active recessive impedance level, "$R_{ACTREC}$," and a recessive impedance level, "$R_{REC}$." The impedance values of $R_{DOM}$, $R_{ACTREC}$, and/or $R_{REC}$ may be determined based on the impedance value of the CAN bus 404, as illustrated by FIG. 4B. For example, if the impedance of the CAN bus is 120 ohm, the impedance value of $R_{DOM}$ may be set to 30 ohm while the impedance value of $R_{ACTREC}$ may be set to the same impedance value of the CAN bus, which is 120 ohm. The impedance value of $R_{REC}$ may be set to indefinite ($\infty$), may comprise a maximum drive impedance value in the range of kilo Ohms or mega Ohms. In an operation, the CAN protocol controller, such as illustrated by FIG. 4A, of the CAN node provides a serial bit stream to the CAN transceiver, such as CAN transceiver 421 illustrated by FIG. 4B, for transmission on the CAN bus. The controller circuitry (e.g., the impedance controller 432 illustrated by FIG. 4B) monitors signal transitions/edges on this bit stream on the TXD path, such as TXD path 457 illustrated by FIG. 4B, and adjusts the impedance value of the impedance bridge accordingly.

At time point, t0, the TXD signal on the TXD path 457 transitions from low to high, which causes a dominant to recessive transition of the differential driver voltage $V_{CAN}$ on the CAN bus 404 (e.g., the different voltage measured between the CANH and CANL terminals 401, 402). It will be appreciated that the low to high transition of TXD signal on the TXD path 457 may not immediately cause a change on the CAN bus voltage $V_{CAN}$ because there may be a delay as the TXD signal on the TXD path 457 is received by the CAN transceiver and converted to a voltage level for the CAN bus. In the dominant state, the control circuitry (e.g., impedance controller 432) controls the push resistors, $R_{PUSH1}$ and $R_{PUSH2}$, to stay at a dominant impedance level (e.g., 15Ω) and the pull resistors, $R_{PULL1}$ and $R_{PULL2}$, to stay high ohmic, which results in a low ohmic driver impedance, $Z_{CAN}$, that is at the dominant impedance level, $R_{DOM}$ (e.g., 30Ω).

In response to the detection of the dominant to recessive transition at time point, t0, the control circuitry (e.g., impedance controller 432) controls the push resistors, $R_{PUSH1}$ and $R_{PUSH2}$, and the pull resistors, $R_{PULL1}$ and $R_{PULL2}$, to control the driver impedance, $Z_{CAN}$, unchanged. For example, between time point, t0, and time point, t1, the resistance value of each of the push resistors, $R_{PUSH1}$ and $R_{PUSH2}$, and the pull resistors, $R_{PULL1}$ and $R_{PULL2}$, is changed that the CAN bus voltage, $V_{CAN}$, ramps from $V_{DOM}$ to zero while the driver impedance, $Z_{CAN}$, stays constant. The control circuitry may gradually increase the resistance values of the push resistors, $R_{PUSH1}$ and $R_{PUSH2}$, from one value (e.g., 15 Ohms) to a higher value (e.g., 30 Ohms) while decrease the resistance values of the pull resistors, $R_{PULL1}$ and $R_{PULL2}$, from "infinite" to a certain value (30 Ohms). At the time point, t1, the resistance values of the push resistors, $R_{PUSH1}$ and $R_{PUSH2}$, and the pull resistors, $R_{PULL1}$ and $R_{PULL2}$, may be identifiable to each other, while the driver impedance, $Z_{CAN}$, stays constant. At time point, t1, the CAN bus voltage, $V_{CAN}$, reaches the recessive state (0V), and in some embodiments, reaches a voltage value below the recessive state (-V) and the control circuitry controls the driver impedance, $Z_{CAN}$, unchanged from the impedance value of the driver impedance, $Z_{CAN}$, at time point, t0. After the CAN bus voltage, $V_{CAN}$, reaches the recessive state (0V), the control circuitry controls the driver impedance, $Z_{CAN}$, unchanged for another time duration. By controlling the driver impedance, $Z_{CAN}$, unchanged during the ramping down of the CAN bus voltage, $V_{CAN}$, the energy dissipated into the CAN network can be reduced, resulting in lower reflection on the CAN bus (e.g., bus 404).

At time point, t2, the control circuitry (e.g., impedance controller 432) begins to increase the driver impedance, $Z_{CAN}$, from the low ohmic impedance of $R_{DOM}$, to a higher value until time point, t3. For example, at least one of the push resistors, $R_{PUSH1}$ and $R_{PUSH2}$, and the pull resistors, $R_{PULL1}$ and $R_{PULL2}$, may be implemented as a resistor ladder or other adjustable resistor network and the control circuitry can increase the resistance value of at least one of the push resistors, $R_{PUSH1}$ and $R_{PUSH2}$, and the pull resistors, $R_{PULL1}$ and $R_{PULL2}$, (e.g., by controlling switches within a resistor ladder or other adjustable resistor network to connect a resistor component). At time point, t3, the driver impedance, $Z_{CAN}$, reaches the active recessive impedance level, $R_{ACTREC}$, which may be adapted to the characteristic impedance of the CAN network cable (e.g. 120 ohm) or any other suitable value. Because the CAN bus voltage, $V_{CAN}$, is kept at 0V (and/or brought up to 0V) while the driver impedance, $Z_{CAN}$, is increased, the impedance change will not result in large amount of energy dissipating into the CAN network and thus reduce or prevent a new reflection on the CAN bus. The adjustment of the driver impedance, $Z_{CAN}$, may be performed continuously over time and may be increased at a constant change rate. In some embodiments, the constant change rate of the driver impedance, $Z_{CAN}$, is set to be lower than a predefined value to gradually increase the driver impedance, $Z_{CAN}$. The control circuitry can adjust the driver impedance, $Z_{CAN}$, by controlling the push resistors, $R_{PUSH1}$ and $R_{PUSH2}$, and the pull resistors, $R_{PULL1}$ and $R_{PULL2}$, to increase their impedances from a starting push impedance (e.g., $Z_{CAN}=30\Omega$) to a target push impedance (e.g., $Z_{CAN}=120\Omega$). In some embodiments, the control circuitry increases the impedances of the push resistors, $R_{PUSH1}$ and $R_{PUSH2}$, and the pull resistors, $R_{PULL1}$ and $R_{PULL2}$, continuously over time at a constant change rate. In some embodiments, the time duration between time point, t1, and time point, t2, is zero.

The reflection on the CAN bus, such as CAN bus 404 illustrated by FIG. 4B, is suppressed up to time point, t4. The longer the time duration between time point, to, and time point, t4 is, the better the ringing suppression performance will be. At time point, t4, the control circuitry (e.g., impedance controller 432) begins to increase the driver impedance, $Z_{CAN}$, from the active recessive impedance level, $R_{ACTREC}$, to a higher value until time point, t5. At time point, t5, the driver impedance, $Z_{CAN}$, reaches the recessive impedance level, $R_{REC}$. In some embodiments, the time during between time point, t4, and time point, t5, is above a certain time duration to reduce or prevent additional energy from dissipating into the CAN network in case the bus voltage is not zero at time point, t4. For example, the bus voltage may not be zero at time point, t4, if another transmitter is also driving the bus dominant, e.g., during arbitration or when an error frame is transmitted. The threshold time duration between t4 and t5 depends on the network topology complexity.

Figure 6:
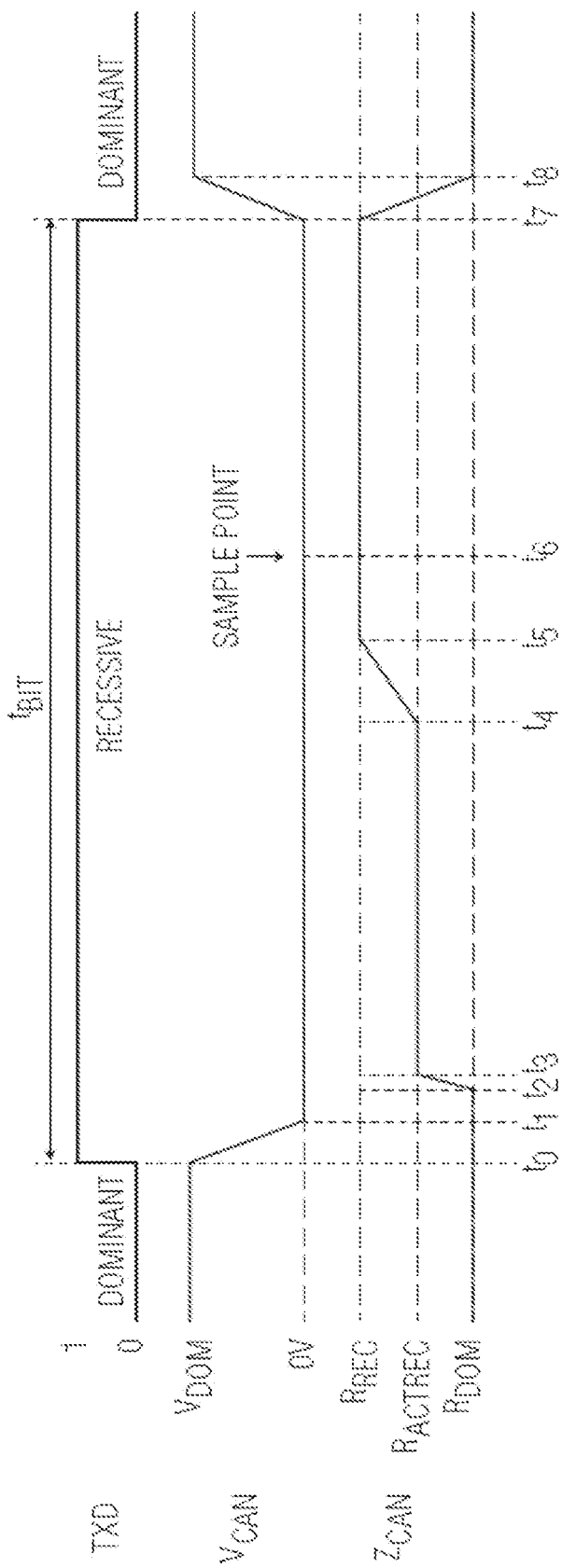
FIG. 6 illustrates an extension of the signal timing diagram of the CAN transceiver depicted in FIG. 4B during a CAN arbitration phase or a data phase with low baud rate, in accordance with the present disclosure.

FIG. 6 illustrates an extension of the signal timing diagram of the CAN transceiver 421 depicted in FIG. 4B during a CAN arbitration phase or a data phase with low baud rate, in accordance with various embodiments. The arbitration bit rate of the CAN network depends on the network complexity. In some embodiments, the arbitration bit rate of the CAN network is lower than 1 Mbps (e.g., 500 kbps (tbit=2 us) or lower). The CAN protocol controller may have a sample point at a certain percentage (typically 60%-80%) of the arbitration bit time. At time point, t6, CAN data is sampled while the driver impedance, $Z_{CAN}$, is high ohmic (recessive), indicating that the arbitration process is not affected when one or more other CAN transmitters are still dominant on the CAN bus. Beginning from time point, t7, through time point, t8, the CAN transceiver transitions from recessive to dominant for the next bit period.

Figure 7:
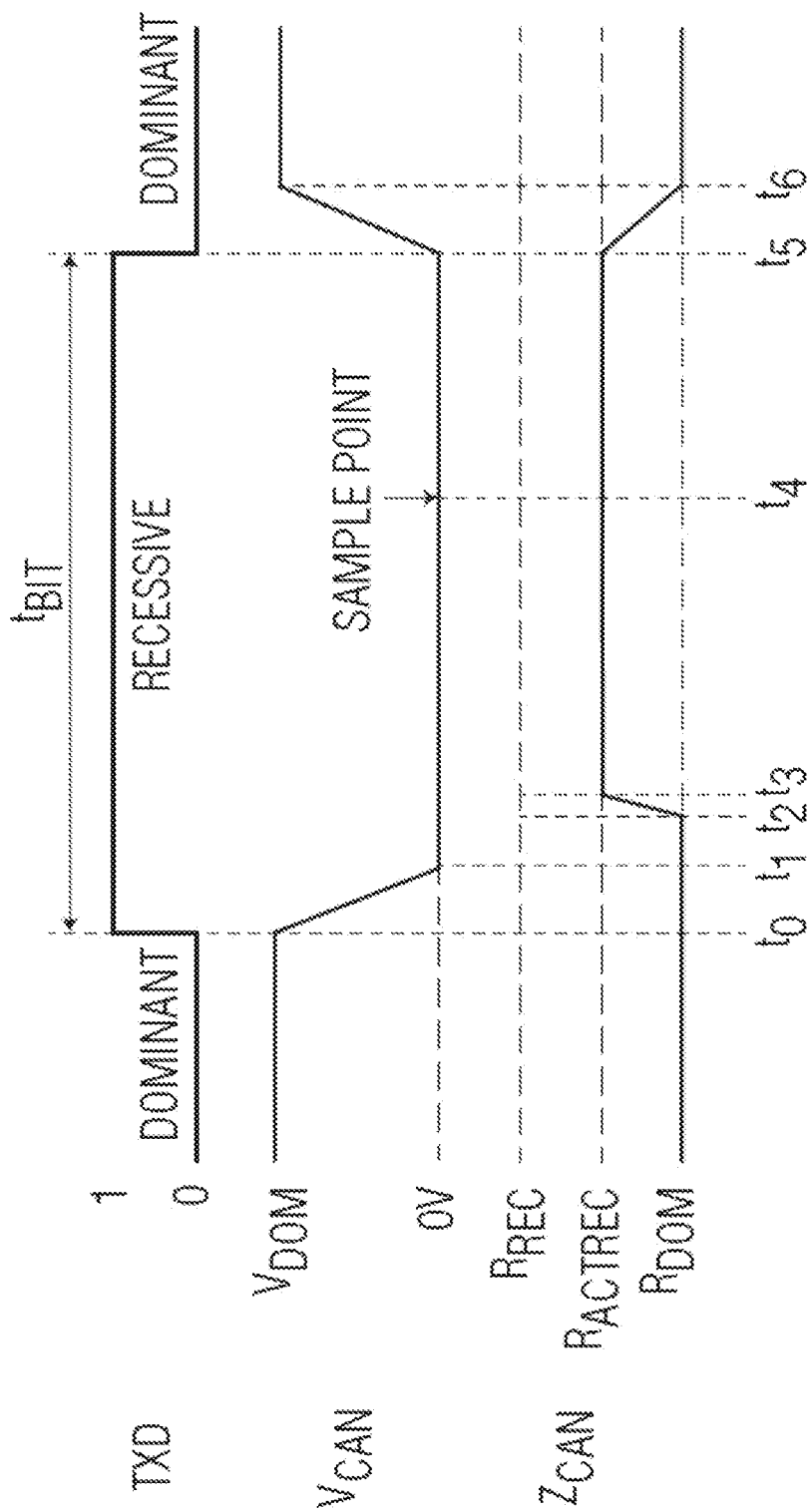
FIG. 7 illustrates a signal timing diagram of the CAN transceiver depicted in FIG. 4B during a high data rate phase, in accordance with the present disclosure.

FIG. 7 illustrates a signal timing diagram of the CAN transceiver 421 depicted in FIG. 4B during a high data rate phase (e.g., the data-phase of 5 Mbps), in accordance with various embodiments. In the signal timing diagram illustrated in FIG. 7, the driver impedance, $Z_{CAN}$, of the impedance bridge 430 is controlled by the controller circuitry, such as impedance controller 432 illustrated by FIG. 4B, to switch between the dominant impedance level, $R_{DOM}$, and the active recessive impedance level, $R_{ACTREC}$. In an operation, the CAN protocol controller of the CAN node (shown in FIG. 4A) provides a serial bit stream to the CAN transceiver 421 for transmission on the CAN bus. The impedance controller 432 monitors signal transitions/edges on this bit stream at the TXD path 457 and adjusts the impedance value of the impedance bridge accordingly.

The signal timing diagram illustrated in FIG. 7 at time points t0-t3 is identical to the signal timing diagram illustrated in FIG. 5 at time points t0-t3. The reflection on the CAN bus 404 is suppressed up to time point, t5. The longer time the duration between time point, t0, and time point, t5 is, the better the ringing suppression performance will be. At time point, t4, CAN data is sampled while the driver impedance, $Z_{CAN}$, is the active recessive impedance level, $R_{ACTREC}$, indicating that the error management process is not affected when one or more other CAN transmitters are driving a dominant error frame on the CAN bus. At time point, t5, the TXD signal at the TXD path 457 transitions from recessive to dominant and the impedance controller 432 begins to decrease the driver impedance, $Z_{CAN}$, from the active recessive impedance level, $R_{ACTREC}$, to a lower value until time point, t6. At time point, t6, the driver impedance, $Z_{CAN}$, reaches the dominant impedance level, $R_{DOM}$, (e.g. $Z_{CAN}=30$ ohm). The active recessive phase may be longer than the minimum bit time of the data-phase and the transition from active recessive to recessive may be skipped. For example, if the arbitration bit-rate is 500 kbps (tbit=2 us) and the data-phase bit-rate is 5 Mbps (tbit=200 ns), the active recessive phase is allowed to be longer than 200 ns, as long as the active recessive phase is short enough to such that the TXD signal is recessive during the sample point of the arbitration bit (e.g., 60% of 2 us=1.2 us). In essence, instead of the data-phase bit-rate, the arbitration bit-rate decides the maximum duration of the ringing suppression.

Although the timing diagrams illustrated by FIGS. 5-7 illustrate $V_{CAN}$ at t1 as 0V, as described above, in various embodiments, at time point, t1, the CAN bus voltage, $V_{CAN}$, is driven to and may reach a voltage value below 0V (−V). For example, FIG. 2B illustrates such an example timing diagram.

In an embodiment, the impedance values of $R_{DOM}$ and $R_{ACTREC}$ may be determined based on the impedance value of the CAN bus. For example, if the impedance of the CAN bus is 120 ohm, the impedance value of $R_{DOM}$ may be set to 30 ohm while the impedance value of $R_{ACTREC}$ may be set to lower than the impedance value of the CAN bus, which is 120 ohm. The CAN protocol requires that a single CAN node in the CAN bus network is able to overdrive (e.g., by asserting a dominant voltage on the CAN bus) a recessive bit of another sender at any time if an error is detected. As such, the dominant driver voltage of the CAN node for signaling the detected error has to be stronger than the active recessive driver voltage of other CAN nodes in the same CAN bus network. When a CAN transmitter asserts dominance in the CAN bus during the data-phase, the total bus impedance will be lower since the active recessive output impedance of the transmitter is in parallel with the CAN bus load. For example, the minimum network impedance seen by a transceiver is 50 ohm and the transmitter is able to drive 1.5V at this minimum impedance of 50 ohm (specified in ISO 11898-2:2016), which means the transmitter sources a minimum current of 30 mA into the bus (1.5V/50 Ohms=30 mA). The CAN node asserting active recessive on the CAN bus should be overdriven with the dominant state, meaning the bus voltage at that CAN node should be above 0.9V (maximum receiver threshold specified in ISO 11898-2:2016). The minimum bus impedance should be above 0.9V/30 mA=30 ohm. The active recessive impedance is in parallel with the bus load of 50 ohm and should be a minimum of 1/(1/30-1/50)=75 ohm. Since only one CAN node is transmitting active recessive during the data-phase, the dominant level transmitted by one or more nodes during an error frame can be reliably detected.

Various embodiments are directed to methods for operating a node device in accordance with an embodiment of the invention. For example, a transition of a first differential driver of a transceiver circuit from a first communication mode to a second communication mode, such as a dominant state to a recessive state, is detected. In response to detecting a signal edge of a signal input received at the differential driver, an output impedance of the transceiver circuit is controlled to be within a predefined range of an impedance value at the first communication mode (e.g., dominant state) while a differential driver voltage on a differential bus decreases to a predefined voltage and/or to a voltage that is less than the predefined voltage. In some embodiments, prior to decreasing to the predefined voltage, a signal is provided from sense circuitry to the differential receiver to precondition the differential receiver for the transition. The node device may be the same as or similar to the node depicted in FIG. 4A. The transceiver circuit may be the same as or similar to the transceiver circuit depicted in FIGS. 1A, 1B, 3, and 4A.

Techniques described herein can be applied to any type of networks, including a CAN, a LIN, a MOST network, a FlexRay™ compatible network, and other types of networks. Although in some embodiments a CAN device is described, it should be noted that the invention is not restricted to CAN devices. In an embodiment, the above-described techniques can be applicable to CAN, CAN-FD, and ISO 11898 compliant networks. The above-described techniques can be implemented in a CAN device such as a CAN transceiver IC device, a system chip, an Application Specific Integrated Circuit (ASIC)/Customer Specific Integrated Circuit (CSIC) device, a microcontroller IC device, or an IC device that includes both a CAN transceiver and a microcontroller.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, node, transceiver, receiver, driver, microprocessor, circuit-based apparatuses and/or other circuit-type depictions (e.g., reference numerals 102, 104, 106, 108 of FIG. 1A may depict circuitry as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIG. 2B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, or activities. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
   a differential data bus; and
   a transceiver circuit configured and arranged to send and receive data on the differential data bus, and including
      a differential driver configured and arranged to operate and communicate in a first communication mode and a second communication mode;
      a differential receiver configured and arranged to operate and communicate in the first communication mode and the second communication mode, wherein the differential receiver is configured to monitor the data on the differential bus and output a digital stream that is representative of differential signals on the differential data bus; and
   wherein the transceiver circuit includes sense circuitry, the transceiver circuit is configured and arranged to switch to the second communication mode in response to the sense circuitry detecting a signal edge of a signal input received at the differential driver by:
      the transceiver circuit and the sense circuitry preconditioning the differential receiver for transitioning to the second communication mode, wherein the pre-conditioning includes keeping voltage difference on the differential data bus in low and high state below a predefined value.

2. The transceiver circuit of claim 1, further including control circuitry configured and arranged to control an output impedance of the transceiver circuit to be within a predefined range of an impedance value at the first communication mode while a differential driver voltage on the differential data bus decreases to a voltage that overrides a predefined voltage, wherein the differential driver is configured to drive the differential driver voltage on the differential data bus to the voltage that overrides the predefined voltage.

3. The transceiver circuit of claim 1, wherein the first communication mode includes a dominant state and the second communication mode includes a recessive state, and the differential driver is further configured and arranged to drive a differential driver voltage on the differential data bus to a voltage that overrides a predefined voltage, the predefined voltage being lower than a receiver switching voltage of the differential receiver.

4. The transceiver circuit of claim 3, wherein the voltage that overrides the predefined voltage is lower than a receiver switching voltage of the differential receiver.

5. The transceiver circuit of claim 1, wherein the differential driver is further configured and arranged to drive a differential driver voltage to:
a voltage that overrides a predefined voltage in response to the signal edge and for a first period of time; and
the predefined voltage that is greater than the voltage for a second period of time.

6. The transceiver circuit of claim 5, wherein the differential driver is configured and arranged to drive the differential driver voltage to the voltage that overrides the predefined voltage for the first period of time that is between 30-150 nanoseconds.

7. The transceiver circuit of claim 1, wherein the differential driver is configured and arranged to drive a differential driver voltage on the differential data bus to a negative voltage for a period of time.

8. The transceiver circuit of claim 1, further including sense circuitry configured and arranged to provide a signal to the differential receiver responsive to detecting the signal edge of the signal input received at the differential driver.

9. The transceiver circuit of claim 8, wherein the signal provided to the differential receiver includes an offset to a receiver switching threshold and the differential receiver is configured and arranged to provide a second communication mode output in response to a differential driver voltage exceeding an offset receiver threshold.

10. The transceiver circuit of claim 8, wherein the signal provided to the differential receiver is indicative of the transition of the transceiver circuit to the second communication mode, and the differential receiver is configured and arranged to output a receive data (RXD) signal at a level associated with the second communication mode in response.

11. The transceiver circuit of claim 8, wherein the sense circuitry is further configured and arranged to monitor the signal input to the differential driver to identify the signal edge, the signal input including a transmit data (TXD) signal received at the transceiver circuit.

12. A method for operating a transceiver circuit comprising:
detecting a signal edge of a signal input received at a differential driver of the transceiver circuit; and
in response to detecting the signal edge, switching the transceiver circuit from a first communication mode to a second communication mode by
pre-conditioning a differential receiver of the transceiver circuit for transitioning to the second communication mode, wherein the pre-conditioning includes keeping voltage difference on the differential data bus in low and high state below a predefined value, wherein the differential receiver is configured to monitor the data on the differential bus and output a digital stream that is representative of differential signals on the differential data bus, wherein pre-conditioning the differential receiver for the transition to the second communication mode includes providing a signal to the differential receiver responsive to detecting the signal edge of the signal as received at the differential driver, and controlling an output impedance of the transceiver circuit to be within a predefined range of an impedance value at the first communication mode and while a differential driver voltage decreases to a predefined voltage.

13. The method of claim 12, further including controlling the output impedance of the transceiver circuit to be within the predefined range of the impedance value at the first communication mode and while driving the differential driver voltage on the differential data bus to:
a first voltage for a first period of time in response to detecting the signal edge; and
a second voltage that is greater than the first voltage for a second period of time after the first period of time, wherein the second voltage is predefined for switching the differential receiver from the first communication mode to the second communication mode.

14. An apparatus comprising:
a differential data bus; and
a transceiver circuit configured to send and receive data on the differential data bus, to detect a signal edge of a received signal input, and the transceiver circuit including a differential driver and a differential receiver to communicate on the differential data bus in a first communication mode and in a second communication mode; and
the transceiver circuit being further configured to
switch to the second communication mode in response detecting a signal edge of the signal input received at the differential driver by pre-conditioning the differential receiver, including keeping a voltage difference on the differential data bus in low and high state below a predefined value, for transitioning to the second communication mode, and
respond to the signal edge of the signal input received at the differential driver of the transceiver circuit to expedite switching to the second communication mode edge when, during operation, the voltage difference on the differential data bus is below a switching threshold of the differential receiver.

15. The apparatus of claim 14, wherein the differential driver is to drive the differential data bus with a differential driver voltage that overrides a predefined voltage to facilitate the pre-conditioning.

16. The apparatus of claim 14, wherein the transceiver circuit is further configured to respond to the signal edge of the signal input by mitigating delay of a related signal that is indicative of the second communication mode.

17. The apparatus of claim 14, wherein the transceiver circuit is further configured to respond to the signal edge of the signal input by minimizing a state-transition period manifested by the differential receiver.

* * * * *